US008886882B2

(12) United States Patent
Nakajima

(10) Patent No.: US 8,886,882 B2
(45) Date of Patent: Nov. 11, 2014

(54) METHOD AND APPARATUS OF STORAGE TIER AND CACHE MANAGEMENT

(75) Inventor: Akio Nakajima, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 13/618,376

(22) Filed: Sep. 14, 2012

(65) Prior Publication Data

US 2014/0082310 A1 Mar. 20, 2014

(51) Int. Cl.
*G06F 12/08* (2006.01)
*G06F 12/02* (2006.01)

(52) U.S. Cl.
CPC .............. *G06F 12/08* (2013.01); *G06F 12/023* (2013.01)
USPC .................... 711/117; 711/162; 711/E12.041

(58) Field of Classification Search
CPC ... G06F 12/023; G06F 12/08; G06F 12/0871; G06F 2212/1024; G06F 2212/1041
USPC ........................... 711/117, 118, 162, E12.041
See application file for complete search history.

(56) References Cited

U.S. PATENT DOCUMENTS

| | | | | |
|---|---|---|---|---|
| 7,949,631 | B2 | 5/2011 | Faunce et al. | |
| 2006/0004957 | A1* | 1/2006 | Hand et al. | 711/113 |
| 2009/0216976 | A1* | 8/2009 | Maki et al. | 711/162 |
| 2011/0010514 | A1* | 1/2011 | Benhase et al. | 711/162 |
| 2011/0178986 | A1* | 7/2011 | Prahlad et al. | 707/640 |
| 2012/0079583 | A1 | 3/2012 | Christiansen et al. | |
| 2012/0110281 | A1 | 5/2012 | Green et al. | |
| 2013/0145095 | A1* | 6/2013 | McKean et al. | 711/122 |
| 2013/0179649 | A1* | 7/2013 | Green et al. | 711/162 |

OTHER PUBLICATIONS

INCITS T10/11-059r9 proposal document, "SBC-3/SPC-4—Copy Offload operations", published Nov. 3, 2011, http://www.t10.org/cgi-bin/ac.pl?t=d&f=11-059r9.pdf.

INCITS T10/12-086r3 propsal document, "SBC-4 SPC-5 Scattered writes, optionally atomic", published Jul. 10, 2012, URL http://www.t10.org/cgi-bin/ac.pl?t=d&f=12-086r3.pdf.

INCITS T10/12-087r3 proposal document, "SBC-4 SPC-5 Gathered reads—optionally atomic", published Jul. 10, 2012, URL http://www.t10.org/cgi-bin/ac.pl?t=d&f=12-087r3.pdf.

* cited by examiner

*Primary Examiner* — Hal Schnee
(74) *Attorney, Agent, or Firm* — Procopio, Cory, Hargreaves & Savitch LLP

(57) ABSTRACT

Storage systems and methods directed to tier management and tier movement. Tier management is conducted based on access frequency of data in a storage subsystem in comparison to the storage subsystem tier. The storage system may then manage cache pre-fetch or tier movement as file location granularity without a special management interface from the host to the storage system.

20 Claims, 32 Drawing Sheets

Batching command history table 60

| batching cmd (61) | LBA List (62) | R/W Access freq. (63) |
|---|---|---|
| Gather Read #1 | LBA #B / length | High |
| | LBA #D / length | High |
| Proxy Write #2 | LBA #A/ length | High |
| | LBA #C/ length | Low |
| ... | ... | ... |

FIG. 6

| Cache Table 70 | | |
|---|---|---|
| LBA ~71 | Cache area ~72 | Grouping ~73 |
| LBA #A | Cache area #1 | N/A |
| LBA #B | Cache area #2 | N/A --> #1 |
| LBA #C | Cache area #3 | N/A |
| LBA #D | Cache area #4 | N/A --> #1 |
| ... | ... | ... |

Latest access → Oldest access

Tier Table 80

| LBA (81) | Tier (82) | Grouping (83) |
| --- | --- | --- |
| LBA #A | 1st tier | N/A |
| LBA #B | 2nd tier | N/A |
| LBA #AA | 2nd tier | #1 |
| LBA #BB | 2nd tier | #1 |
| ... | ... | ... |

FIG. 8

Batching command history table 60

| batching cmd | LBA List | R/W Access freq. |
|---|---|---|
| Proxy Read token #A (copy source) | LBA #A | High --> Low |
| | LBA #B | High --> Low |
| Proxy Write token #A (copy destination) | LBA #AA | High |
| | LBA #BB | Mid |
| ... | ... | ... |

{ 61, 62, 63 } same token set 2200

Low tier grouping 2201
High tier grouping 2202

Tier Table 80

| LBA | Tier | Grouping |
|---|---|---|
| LBA #A | move to lower | N/A --> #1 |
| LBA #B | move to lower | N/A --> #1 |
| LBA #AA | move to higher | N/A --> #2 |
| LBA #BB | move to higher | N/A --> #2 |
| ... | ... | ... |

{ 81, 82, 83 } low tier grouping 2203
High tier grouping 2204

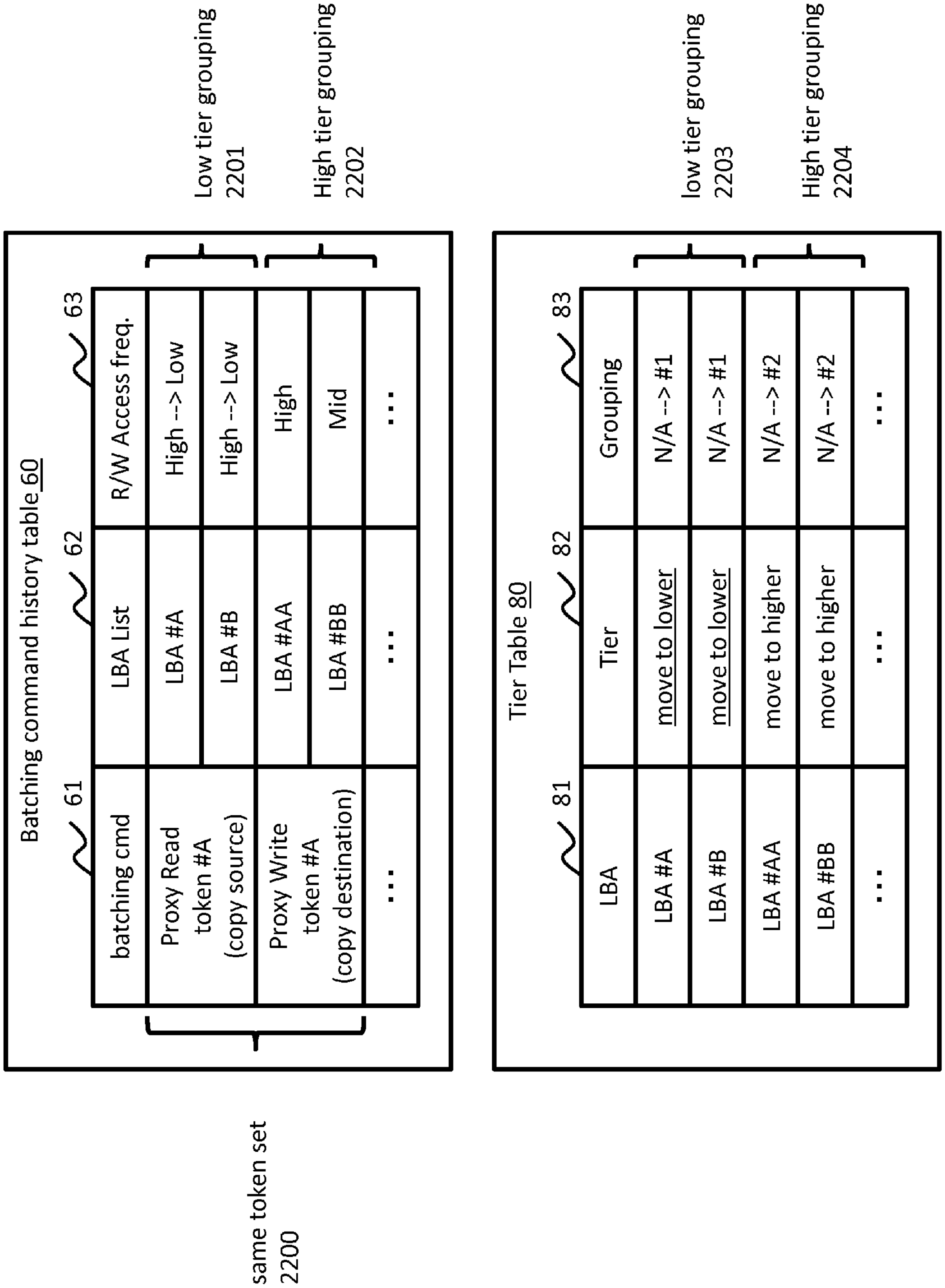

FIG. 22

METHOD AND APPARATUS OF STORAGE TIER AND CACHE MANAGEMENT

BACKGROUND

1. Field

The present application is generally directed to storage subsystems, and more specifically, to storage tier management, cache management and interface protocol of block storage.

2. Related Art

Related art implementations of tier management of storage subsystems are performed such that the storage subsystem moves data blocks when the storage subsystem detects a threshold of access frequency.

In related art implementations, the new file copy operation is defined by INCITS T10 SCSI (International Committee for Information Technology Standards—Technical Committee 10—Small Computer System Interface). In the related art implementation, the host copy manager sends a read token command with a source logical block addressing (LBA) range parameters list. The storage system returns a message with a read token, and then a host copy manager sends a write token command with a read token message and destination LBA range parameters list. The copy offload provider of the storage system performs copy blocks from the source LBA range parameters list described in the read token command related to the token message, to a destination LBA range parameters list described in the write token command related to the same token message.

The Gather Read command and a Scatter Write command are defined by INCITS T10 SCSI block command set (SBC).

In related art implementations, the file layout of the block storage is distributed, with the extent of the file system described as location information of partial file blocks.

SUMMARY

Aspects of the example implementations involve a storage system, which may involve an interface configured to receive a command from a computer; and a controller configured to create a relationship between a plurality of areas storing a plurality of data executed by the command as a group, and to manage a plurality of data of the plurality of the areas at a same access level based on the relationship.

Aspects of the example implementations include a method, which may involve receiving a command from a computer; creating a relationship between a plurality of areas storing a plurality of data executed by the command as a group, and managing a plurality of data of the plurality of the areas at a same access level based on the relationship.

Aspects of the example implementations include a computer readable storage medium storing instructions for executing a process, which may involve receiving a command from a computer; creating a relationship between a plurality of areas storing a plurality of data executed by the command as a group, and managing a plurality of data of the plurality of the areas at a same access level based on the relationship.

BRIEF DESCRIPTION OF THE DRAWINGS

FIG. 6 illustrates a batching command history table, in accordance with an example implementation.

FIG. 8 illustrates a tier table, in accordance with an example implementation.

FIG. 22 illustrates an interaction between the tier table and the batching command history table for grouping the tier entry, in accordance with an example implementation.

DETAILED DESCRIPTION

In the related art, the file copy operation has two purposes. One purpose is to backup files. Another purpose is to update files to a new revision version. The backup file serves as the copy destination, which may have low frequency access. The new revision version is a copy destination and may have high frequency access, as the old since old revision file is held as a backup file. Depending on the purpose, the access frequency may change whether the copy source or copy destination is higher.

In the related art, the block storage system such as SCSI protocol, may not be capable of determining the location information of a file. Further, the block storage system may be incapable of managing media tier operations at file level of granularity. In the related art, the block storage system may also not be capable of determining the relationship of normal SCSI read and write commands.

In such circumstances, the storage system will be incapable of pre-fetching the next block into the cache memory of the storage system for affecting the performance of the copy operation or the cache hit ratio.

Example implementations address the above related art issues. For example, when the storage system receives copy offload command (e.g. token read command and token write command pair) in an example implementation, the storage system stores the command set and the copy offload parameter list of both the source and the destination of token to a storage tier management table that located in storage system memory.

When the storage system receives a normal read or write operation, a storage tier management program counts access frequency. If the copy destination (source) has a higher access frequency than a upper threshold of the tier storage pool, the storage tier management program moves the copy destination (source) blocks to a higher tier storage pool. If the copy destination (source) has a lower access frequency than a lower threshold of the tier storage pool, the storage tier management program moves the copy destination (source) blocks to a lower tier storage pool.

If the copy destination (source) can access all of the parameter list of the destination (source), the storage cache program can pre-fetch a cache memory of the storage system to perform a whole copy destination (source).

When storage systems receive a copy offload command pair of a read token and a write token in the same token, the storage system copy provider program that received the read token command (source storage) pre-fetches to a cache memory of the storage system.

First Example Implementation

Figure 1:
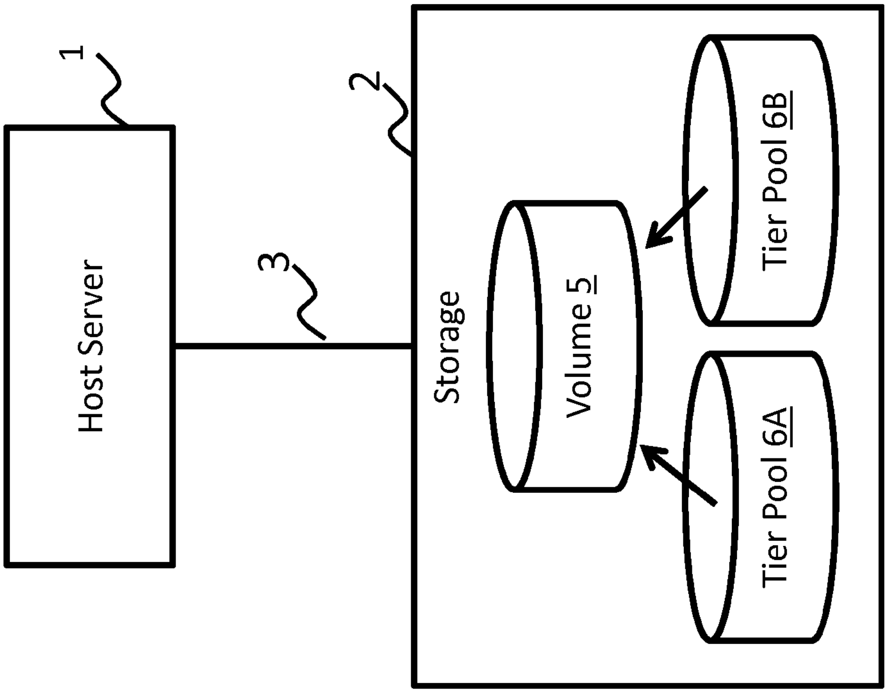
FIG. 1 illustrates a computer environment in accordance with an example implementation.

FIG. 1 illustrates a computer environment in accordance with an example implementation. A block interface 3 such as SCSI (small computer system interface) connects the Host Server 1 and Storage 2. Volume 5 stores data and may be constituted by one or multiple tier pools 6A,6B.

Figure 2:
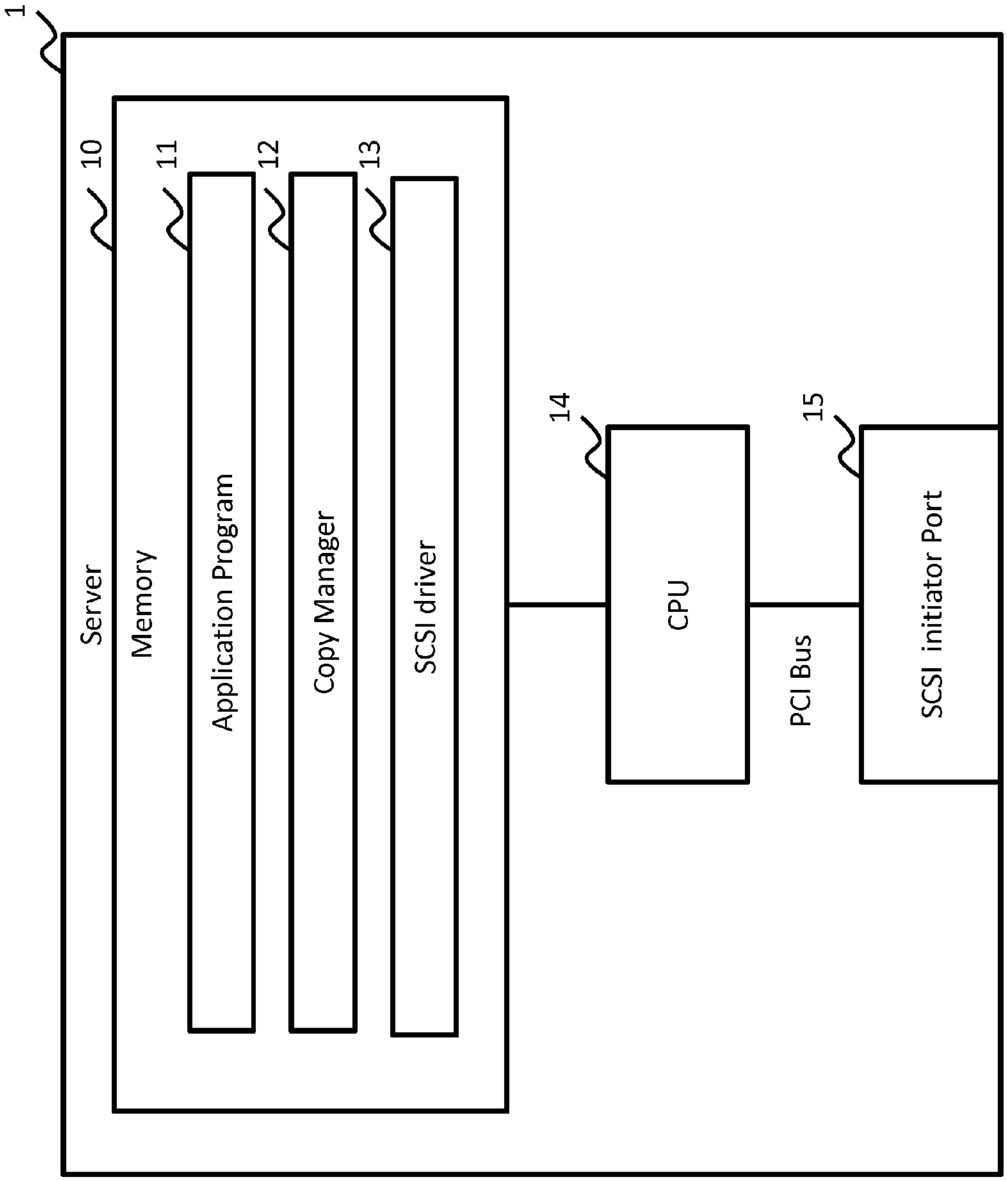
FIG. 2 illustrates a server, in accordance with an example implementation.

FIG. 2 illustrates a server, in accordance with an example implementation. The server 1 may include memory 10, Central Processing Unit (CPU) 14 and SCSI initiator port 15, which may be interconnected by peripheral component interconnect (PCI) Bus. The memory 10 may contain application program 11, copy manager 12, and SCSI driver 13. The CPU 14 and memory 10 may interact with each other to form a server controller to control the server 1. Instructions may be stored on the memory 10 of the server controller, which may be in the form of a computer readable storage medium, which is tangible media such as Random Access Memory (RAM), flash memory, HDD, or the like. The instructions may also be in the form of a computer readable signal medium, which can include non-tangible media such as a carrier wave.

Figure 3:
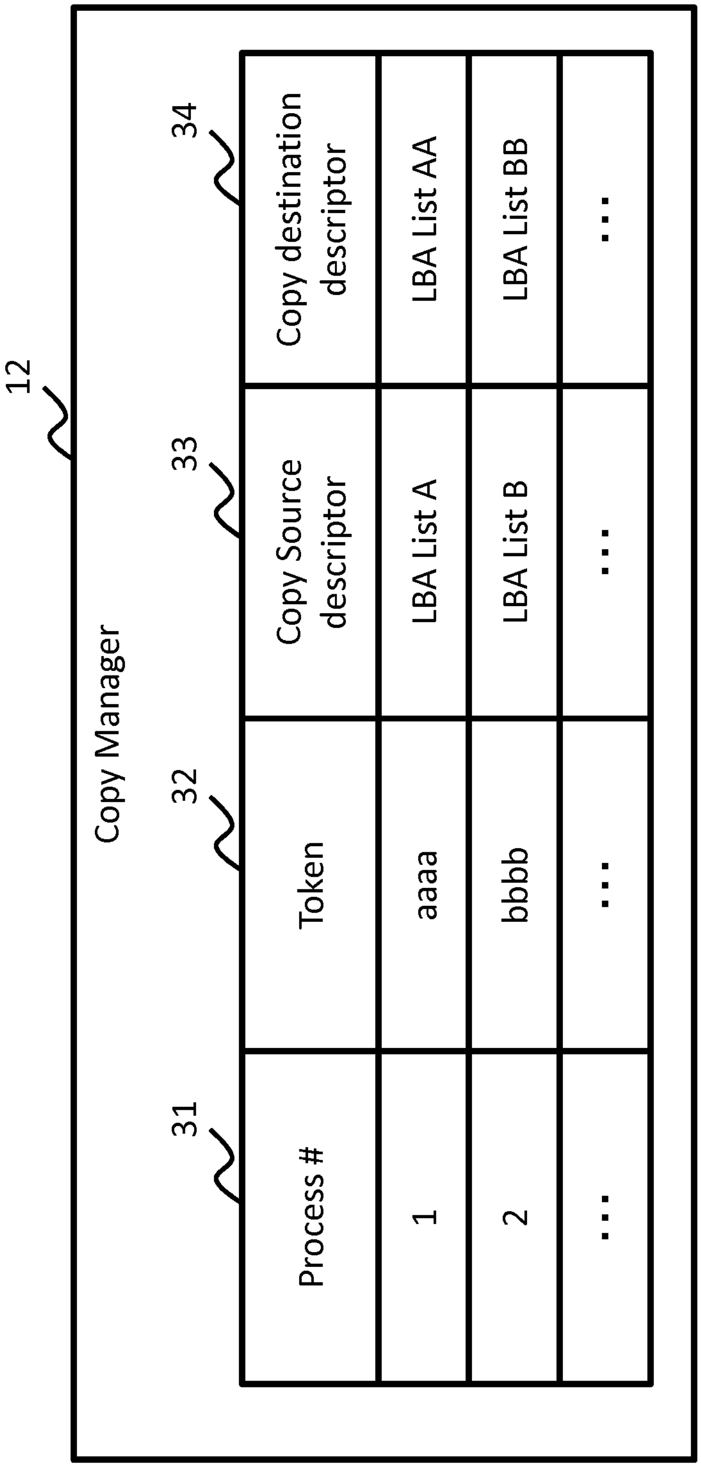
FIG. 3 illustrates a copy manager, in accordance with an example implementation.

FIG. 3 illustrates a copy manager, in accordance with an example implementation. The copy manager 12 may manage information such as a token identifier 31, copy source descriptor 32 and copy destination descriptor 33. The token ID 31 may be created by the storage system when the host sends a proxy read command. The copy source descriptor 33 is a copy offload command (e.g., proxy read command) of source read data. The copy destination descriptor 34 is copy offload command (e.g. proxy write command) of destination write data.

The copy source descriptor 33 and copy destination descriptor 34 may contain information such as source or destination storage port name, LU number, and LBA list. The LBA list includes a start list of LBA range parameters. The LBA range parameters may include associated pairs of LBA addresses and LBA ranges.

Figure 4:
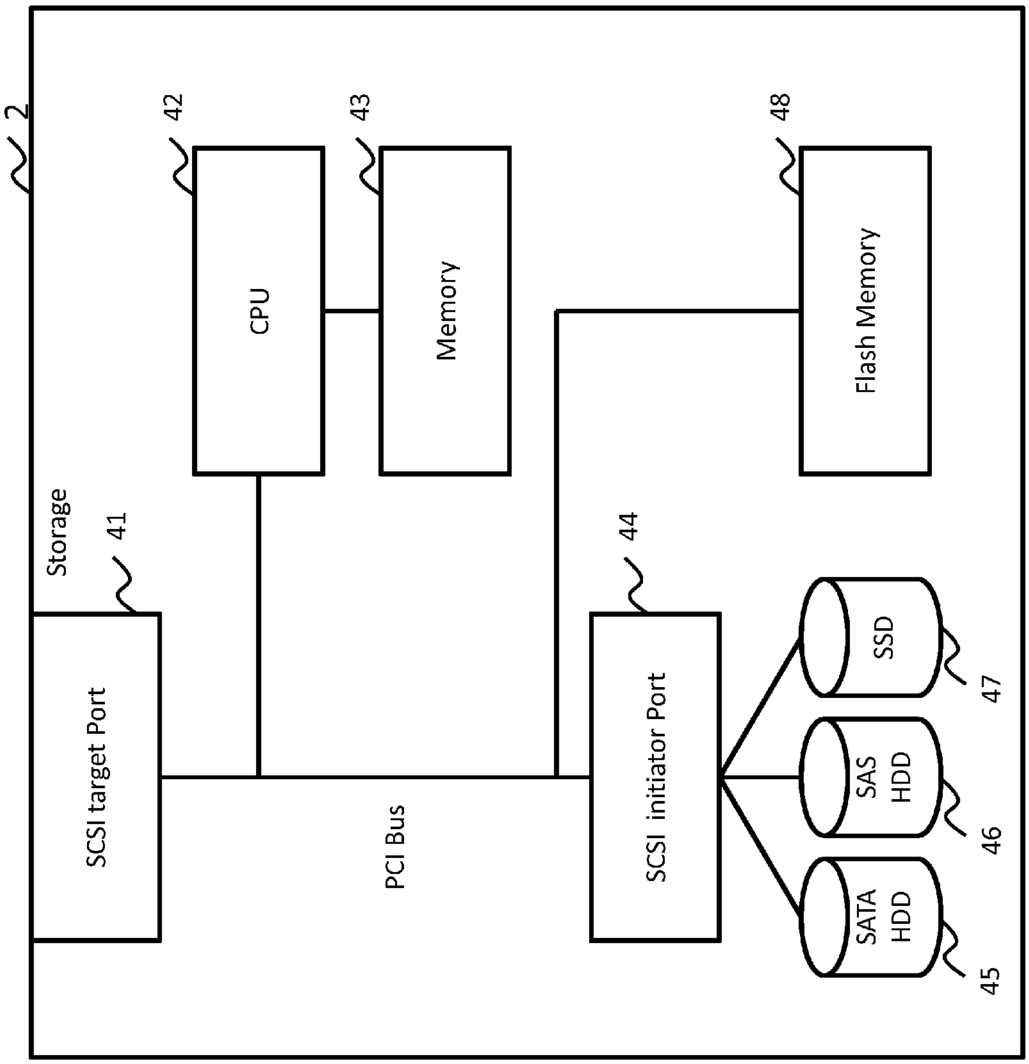
FIG. 4 illustrates a storage, in accordance with an example implementation.

FIG. 4 illustrates a storage 2, in accordance with an example implementation.

The storage 2 may include SCSI target port 41, CPU 42, Memory 43, SCSI initiator port 44, and storage media (e.g. Serial ATA Hard Disk Drives (SATA HDD) 45, Serial Attached SCSI (SAS) HDD 46, solid state drives (SSD) 47, and PCI bus attached flash memory 48). Elements of the storage may be interconnected by PCI Bus. The CPU 42 and Memory 43 may interact with each other in the form of a storage controller to control the storage 2. Instructions for the CPU 42 and Memory 43 to function as the storage controller may be stored in the memory, as illustrated in FIG. 5.

Figure 5:
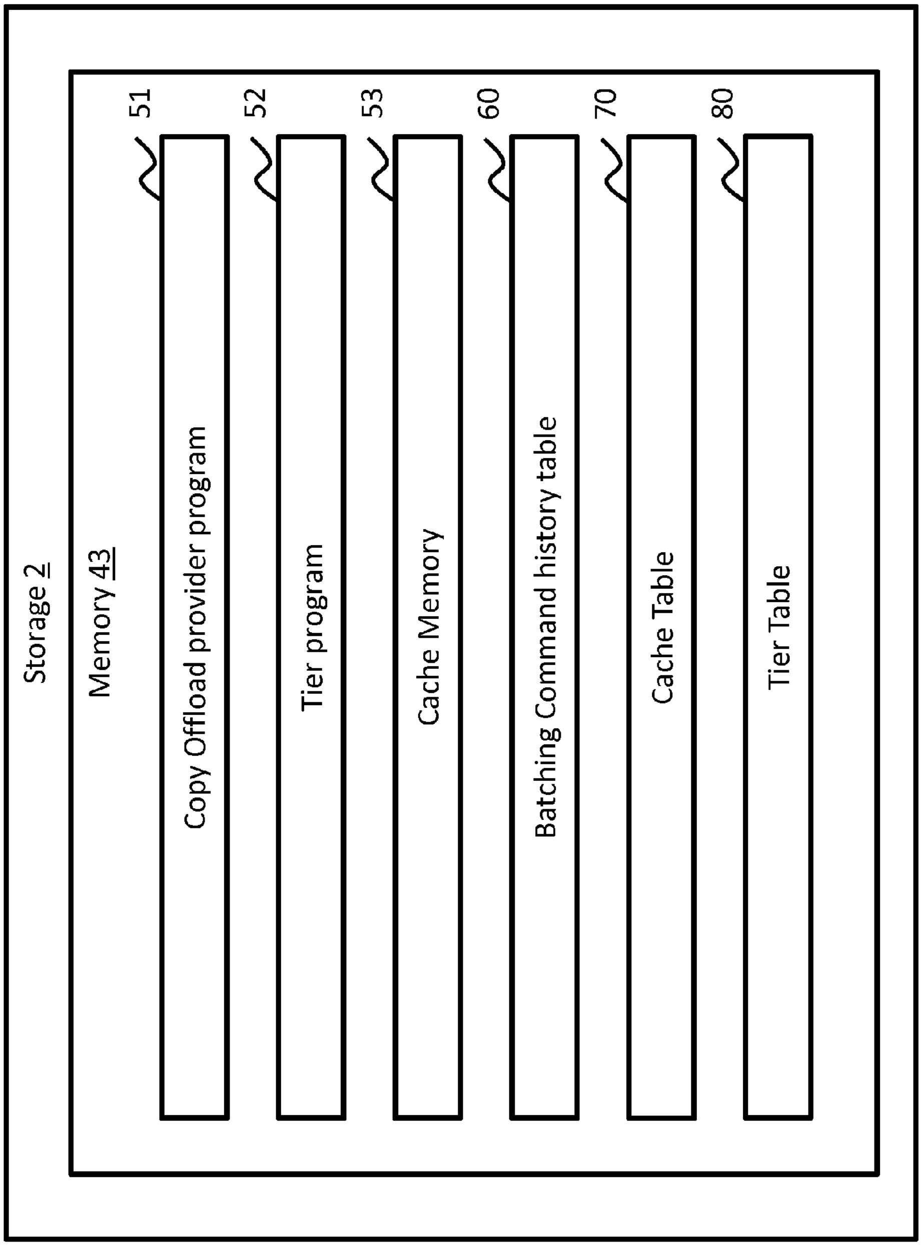
FIG. 5 illustrates storage memory, in accordance with an example implementation.

FIG. 5 illustrates storage memory, in accordance with an example implementation.

The memory 43 of storage 2 may include copy offload provider program 51, Tier program 52, cache memory area 53, batching command history table 60, cache table 70 and tier table 80. The copy offload provider program 51 is configured to execute proxy read and proxy write commands to offload batching of data copy processes. A set of proxy read and proxy write commands is performed by copying from the source of a data block set to the destination of the data block set. The tier program 52 is configured to move data blocks or data pages from the current tier pool to another tier pool to provide performance and space efficiency of low cost media. The cache memory 53 is configured to store data from a storage cache management program to temporarily store the least recently accessed data. The batching command history table 60 is configured to manage information sent by host with proxy read, proxy write, gather read or scatter write or other batching SCSI commands.

These commands may include information such as LBA range lists, and multiple SCSI commands may be gathered from one SCSI operation. The cache table 70 manages information such as the storage manage cache memory layout, so that the storage cache program can manage the latest data access by using a LRU (Least Recently Used) algorithm.

The tier table 80 manages information so that the storage tier program can manage the data location of multiple tier pools and access frequency per blocks or pages. The memory 43 may be in the form of a computer readable storage medium, which may include tangible media such as random access memory (RAM), flash memory, HDDs and the like. The memory 43 may also be in the form of a computer readable signal medium, which may include non-tangible media such as carrier waves.

FIG. 6 illustrates a batching command history table, in accordance with an example implementation. The batching command history table 60 may include information for batching command entries 61. For example, each batching command entry 61 may contain an associated LBA list 62 entry and an associated read or write command access frequency entry 63. Associated LBA list 62 may include an LBA start address and LBA range pair (e.g. LBA #B starting address, and a length for the LBA range). The read or write command entry 63 is counted SCSI Read or Write CDB (Command Descriptor Block) access frequency (e.g. high or low). Such read or write commands may operate on different CDB OPC (operation code) based on the batching command (e.g. proxy read, proxy write, gather read, or scatter write command CDB OPC).

Figure 7:
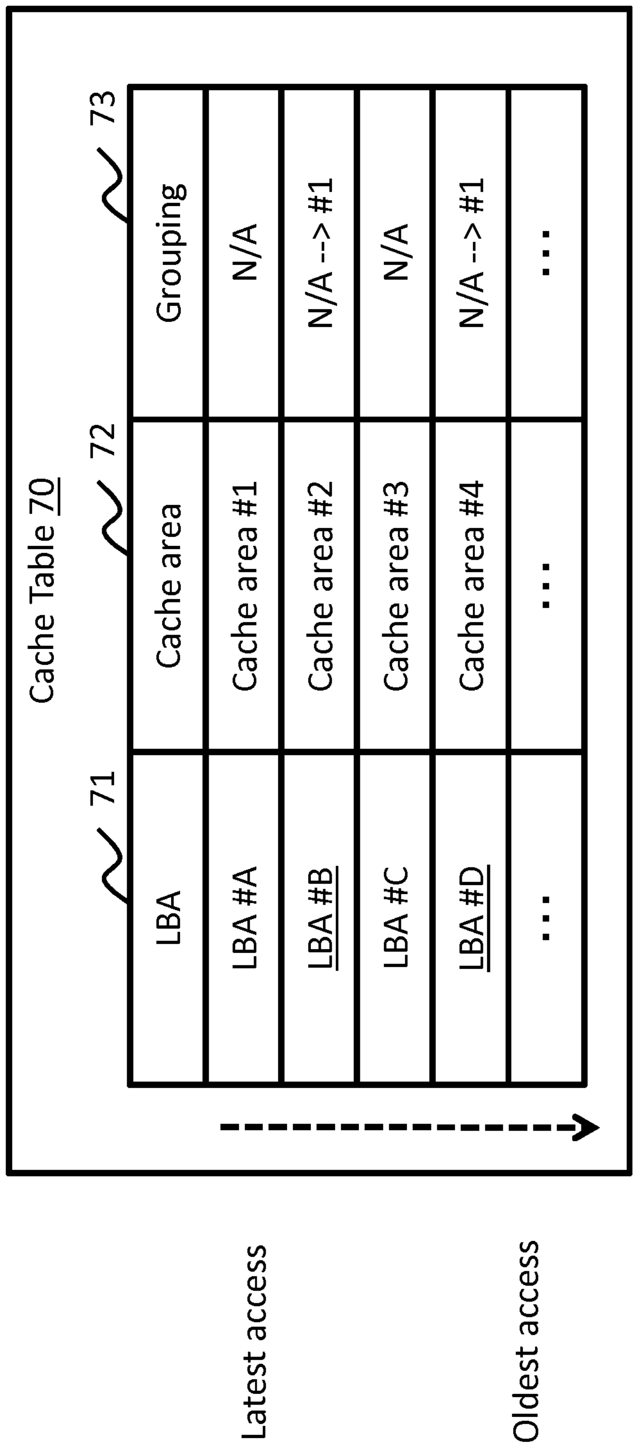
FIG. 7 illustrates a cache table, in accordance with an example implementation.

FIG. 7 illustrates a cache table, in accordance with an example implementation. The cache table 70 may manage information such as the Logical Unit number/LBA information 71, cache location 72, and grouping number 73. Cache table 70 may be further configured to manage cache state information such as clean read data (e.g. disk store data) and dirty write data (e.g. data not already written to disk), depending on the desired implementation. Cache table entries may also be managed in an order from latest accessed data to oldest accessed data. The entries of the oldest accessed data can be stored to disk or media for freeing cache memory.

The cache table 70 may allow a storage cache program to manage the latest data access by using a LRU (Least Recently Used) algorithm. In an example implementation of a cache LRU algorithm, for a cache miss (e.g., cache data does not match command request), when the storage system receives a read or write command, stages data from a disk or receives write data from host, the entry of the latest access cache memory area can be inserted the latest access entry. For a cache hit (e.g., cache data matches command request), when the storage system receives a read or write command, the storage can return read data or update write data immediately from the cache, and the entry is then removed and inserted at the top of the cache table. For a cache empty (e.g., emptying cache space when cache memory is full), when the storage system detects that the cache memory is full, the cache memory data of the oldest accessed data is destaged to disk or media to increase the available cache memory, and then the oldest entry may be removed.

Example implementations are directed to the grouping of cache entries of the same file or same batching command transaction. For example, when a batching command is received and some of the LBA ranges associated with the batching command have a high access frequency, the LBA ranges of the same batching command are grouped to same group identifier. When the host accesses part of the LBA range of same batching transaction (file), the LBA range is grouped with the same group identifier, and the cache program can move the same group identifier entries from their present position in the table to the top of the table.

FIG. 8 illustrates a tier table, in accordance with an example implementation. The tier table 80 may manage information such as entries for page information for the LBA 81, current tier for the LBA 82 and grouping identifier 83. The tier table 80 may be further configured to manage tier information such as access frequency, location of pool information, disk performance information, and so on, depending on the desired implementation. The grouping entry 83 can be defined as same tier grouping, or otherwise, depending on the desired implementation.

Figure 9:
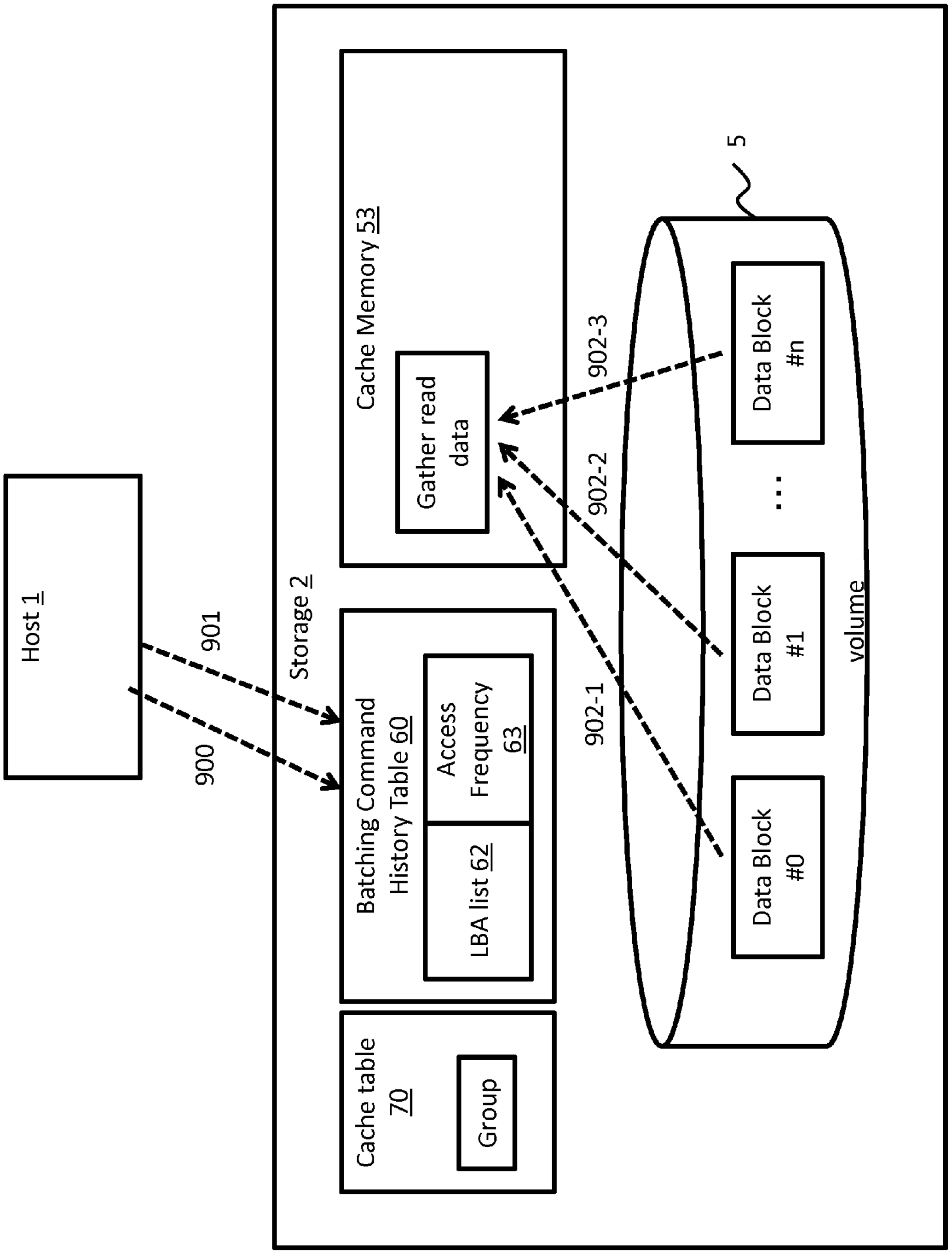
FIG. 9 illustrates a flow diagram of a storage cache program pre-fetching data blocks related to grouping of the cache table, in accordance with an example implementation.

FIG. 9 illustrates a flow diagram of a storage cache program pre-fetching data blocks related to grouping of the cache table, in accordance with an example implementation. At 900, the host issues a gather read command with an LBA range parameter list, wherein the storage program is configured to save the LBA range parameter list in the batching command history table 60. At 901, the host issues a read or write command to storage, wherein the storage tier program manages access frequency of the read or write command. When the threshold of access frequency is exceeded in the same LBA list, entries (e.g. two, or multiple numbers) of the same LBA list are grouped by the same access frequency. The storage cache program can then pre-fetch data blocks having the same LBA list group, as shown at 902-1, 902-2, 902-3.

Figure 10:
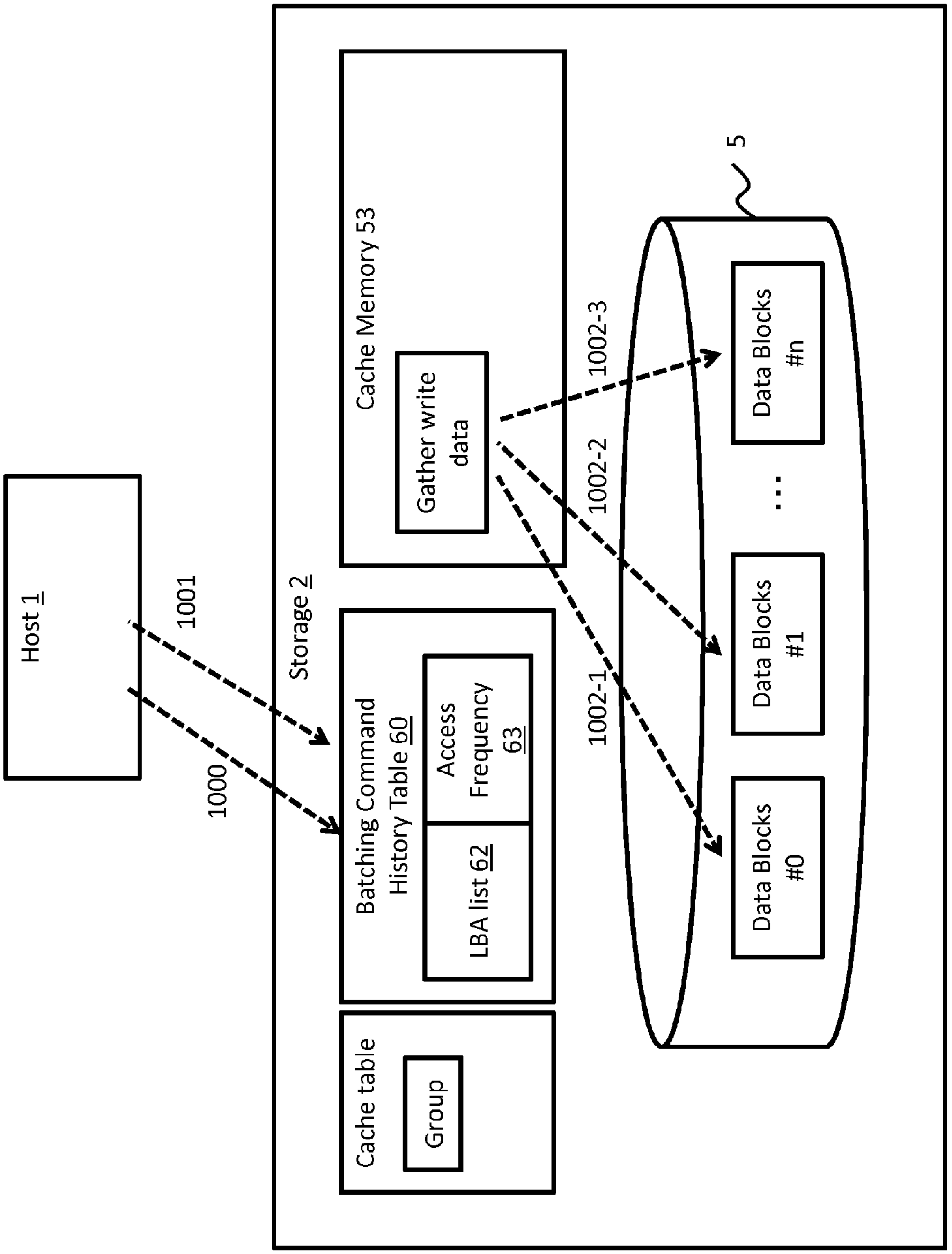
FIG. 10 illustrates a flow diagram of the storage cache program destaging data blocks based on the grouping of the cache table, in accordance with an example implementation.

FIG. 10 illustrates a flow diagram of the storage cache program destaging data blocks based on the grouping of the cache table, in accordance with an example implementation. At 1000, the host issues a gather read command with an LBA range parameter list. The storage cache program saves the LBA range parameter list in the batching command history table 60. At 1001, the host issues a read or write command to the storage, whereupon the storage program manages the access frequency of the read or write command. For example, when the access frequency falls below a lower threshold within the same LBA list, entries (e.g. two or more) in the same LBA list are grouped as a "lower access group". As shown at 1002-1, 1002-2, and 1002-3. when the storage cache program detects that the cache memory has run out of capacity (or the free capacity is below a threshold), the storage cache program destages dirty data blocks from the groups in the LBA list designated as "lower access group". The storage cache program then deletes the clean data blocks designated as "lower access group".

Figure 11:
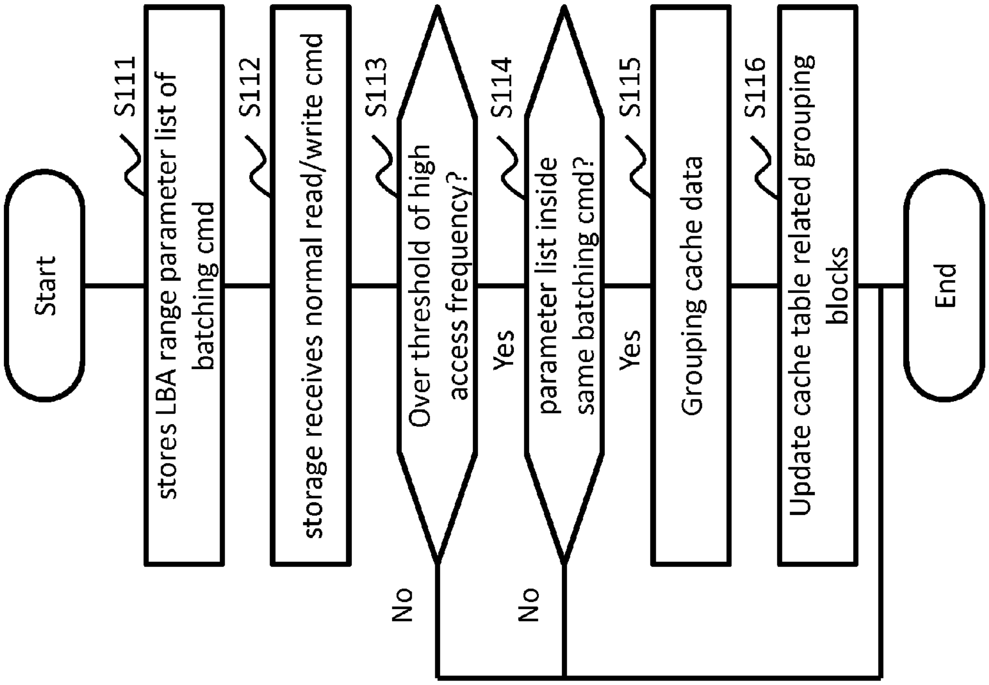
FIG. 11 illustrates a flow chart of the grouping cache entry, in accordance with an example implementation.

FIG. 11 illustrates a flow chart of the grouping cache entry, in accordance with an example implementation. At S111, the storage cache program stores the LBA range parameter list of the batching command to the batching command history table. At S112, the storage receives a read or write command. At S113, the storage cache program counts up the access frequency entry of the LBA range of the batching command history table, which may include the bounds of the LBA of the read or write command, and determines an upper threshold for high access frequency in the batching command history table. At S114, the storage cache program checks if entries (e.g. two or more) of the batching command history table are higher than the upper threshold. At S115, the storage cache program groups entries of the cache having the same higher access frequency as denoted in the batching command history table, so that entries of the same batching command LBA list are grouped together. At S116, when the storage receives a read or write command, the storage cache program updates the cache table by sorting by access (e.g., top of the cache table indicates most recently accessed) and the related entries of same group id of cache table is follow the top of the cache table.

Figure 12:
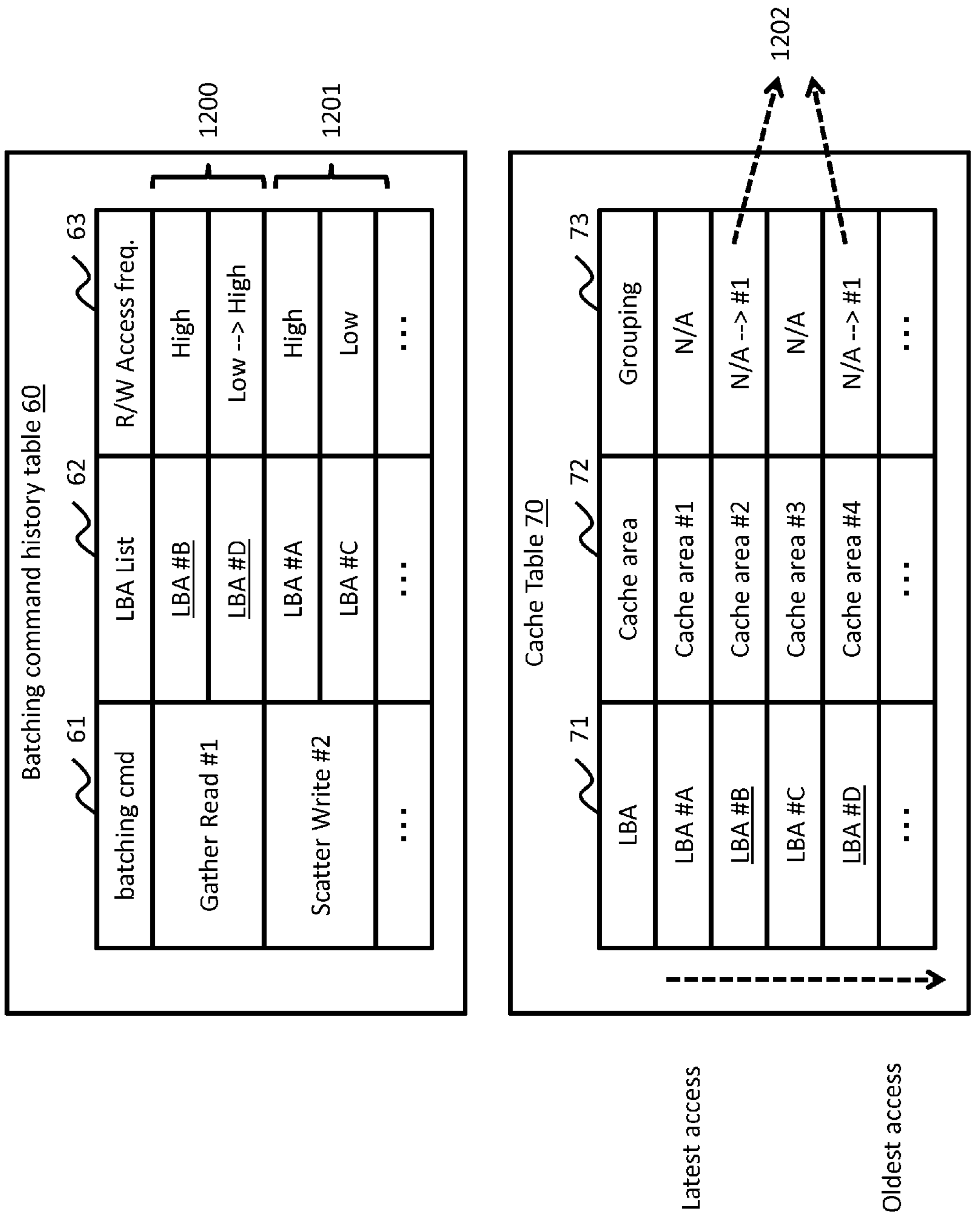
FIG. 12 illustrates a flow diagram for updating the cache table, in accordance with an example implementation.

FIG. 12 illustrates a flow diagram for updating the cache table, in accordance with an example implementation. In the example of FIG. 12, the gather read command #1 in the batching command history table 60 is determined to have high frequency access as shown at 1200. Thus, the cache program updates the grouping entries for LBA #B and LBA #D row of the cache table 70, that are related to LBA list of gather read #1, as shown at 1202. The scatter write function is not determined to have high frequency access as shown at 1201, so the corresponding LBA are not grouped together.

Figure 13:
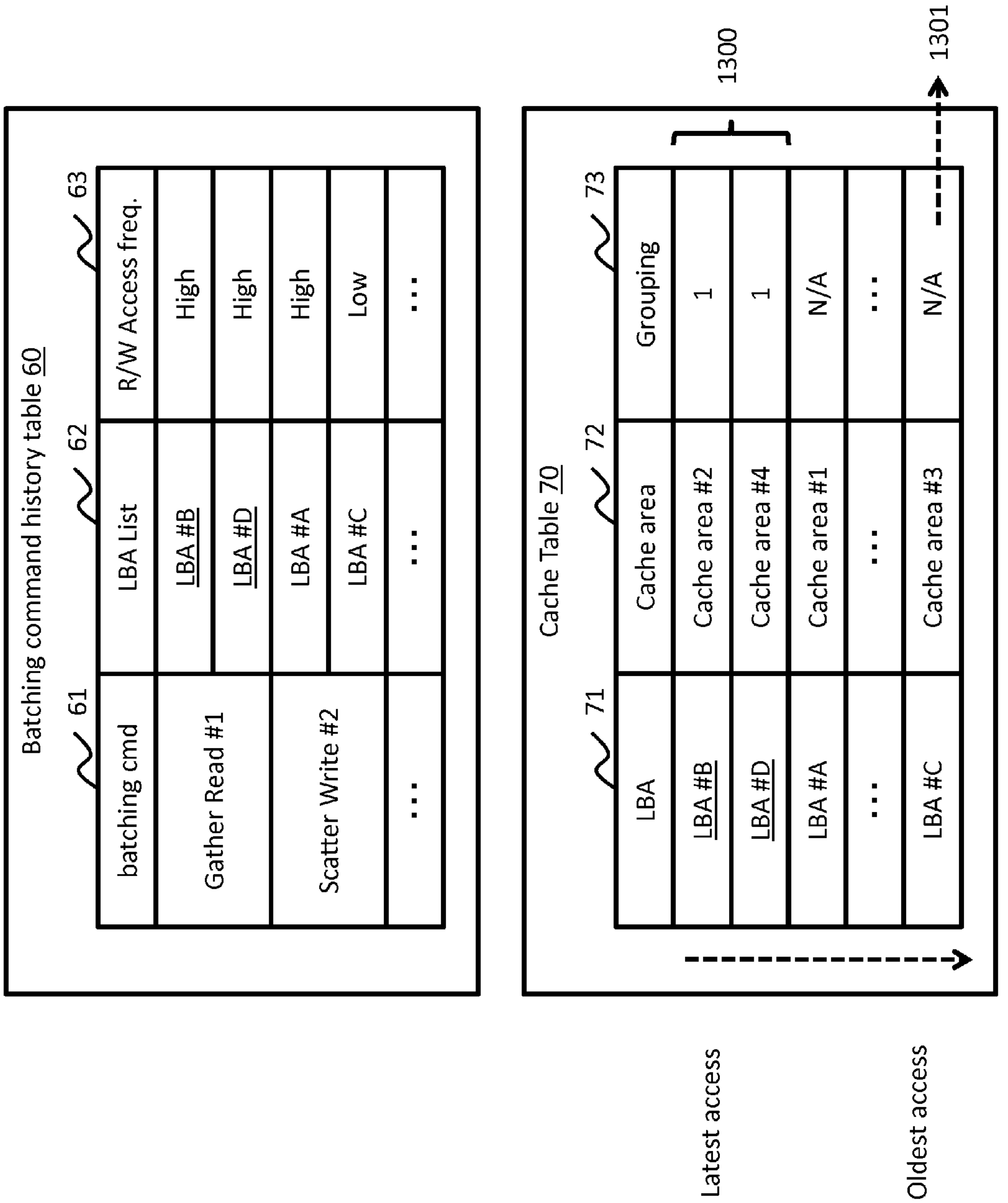
FIG. 13 illustrates a flow diagram for updating the cache table, in accordance with an example implementation.

FIG. 13 illustrates a flow diagram for updating the cache table, in accordance with an example implementation. When the storage receives a read or write command in the LBA #B, the storage cache program updates latest access (top of the list of the cache table) LBA #B and LBA entries having the same group identifier the same group entry (in this example, LBA #D as shown at 1300). LBA #C may be destaged to free cache memory as shown at 1301.

Figure 14:
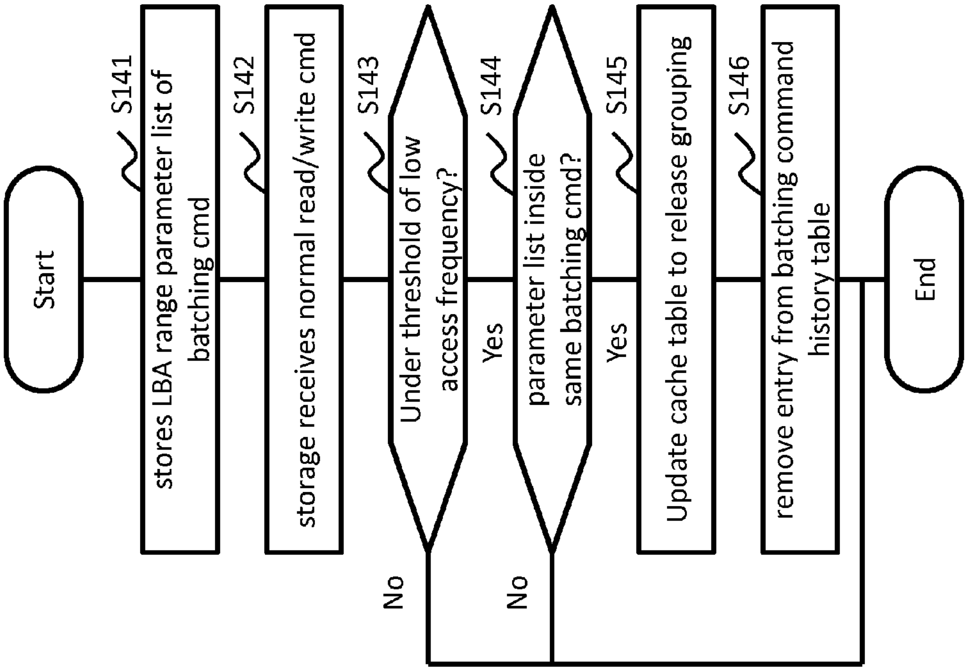
FIG. 14 illustrates a flow chart for grouping cache entries, in accordance with an example implementation.

FIG. 14 illustrates a flow chart for grouping cache entries, in accordance with an example implementation. At S141, the storage cache program stores the LBA range parameter list of the batching command in batching command history table. At S142, the storage receives a read or write command. At S143, the storage cache program determines the access frequency entry of the LBA range in batching command history table associated with the bounds of the LBA associated with the read or write command, and determines the lower threshold for low access frequency in the batching command history table. At S144, if the storage cache program determines that two or more entries of the batching command history table are lower than threshold, then the process proceeds to S145, wherein the storage cache program remove groups entries of the cache table indicated as having a low access frequency of the batching command history table, which also groups entries of the batching command LBA list having the same low access frequency. At S146, if the storage cache program detects a lack of cache capacity (e.g., cache capacity is full, or free capacity has fallen below a threshold), the storage cache program destages dirty data determined to have the oldest access according to the cache table. When the cache entry related the batching command history table is destaged, then the storage cache program remove the entry of the batching command history table.

Figure 15:
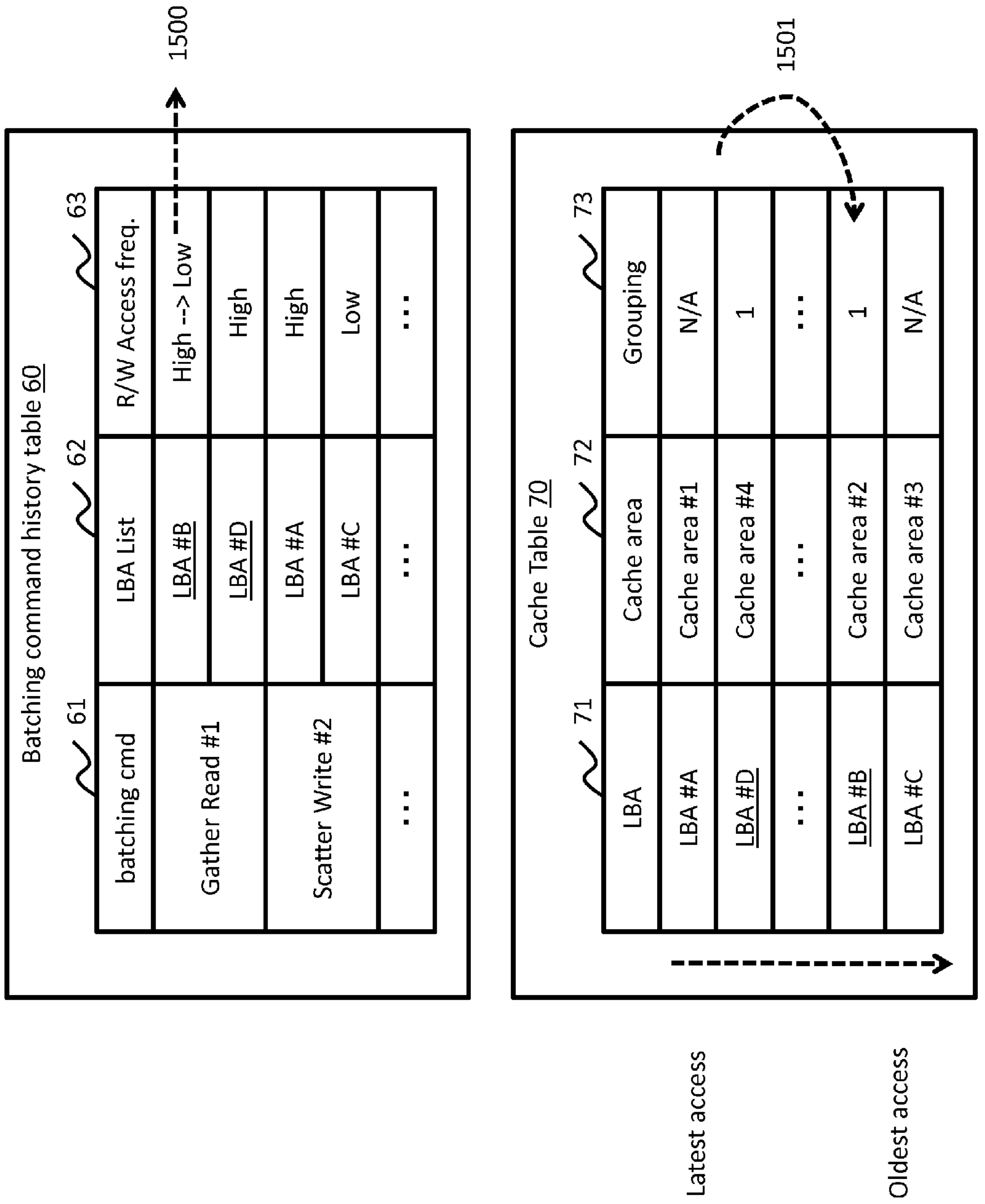
FIG. 15 illustrates a flow diagram for updating the cache table, in accordance with an example implementation.

FIG. 15 illustrates a flow diagram for updating the cache table, in accordance with an example implementation. In the example as shown in FIG. 15, when gather read command #1 of batching command history table is changed to low frequency as shown at 1500, the cache program updates grouping entries of LBA #B row and LBA #D row of cache table related to LBA list of gather read #1 as shown at 1501.

Figure 16:
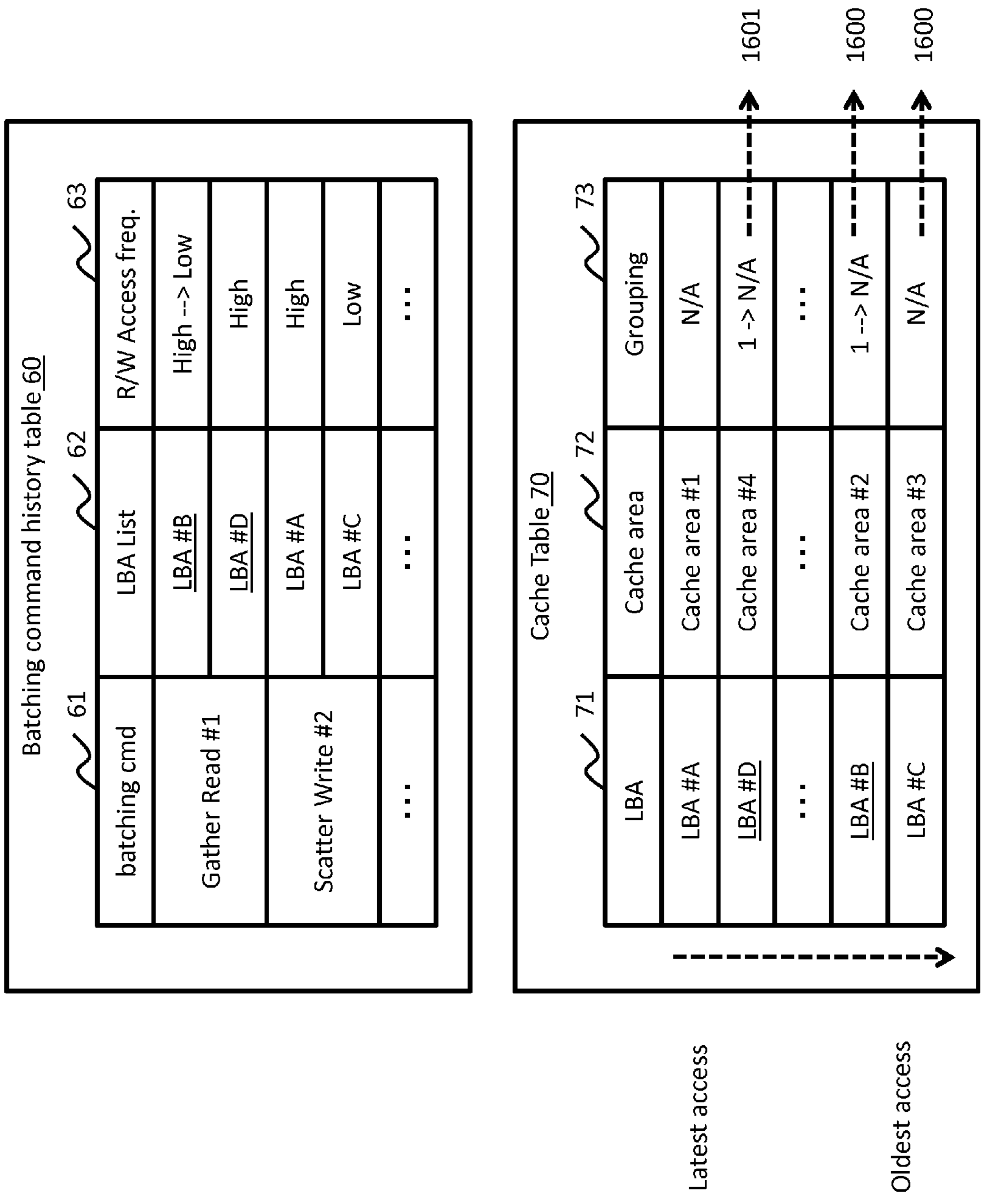
FIG. 16 illustrates a flow diagram for updating the cache table, in accordance with an example implementation.

FIG. 16 illustrates a flow diagram for updating the cache table, in accordance with an example implementation. In the example shown in FIG. 16, when the storage cache program detects a lack of cache memory capacity (e.g., the cache memory is full, or the free cache space falls below a threshold), the storage cache program destages dirty data of LBA #B and LBA #C (e.g. read or write access) to free capacity for the new host command, as shown at 1600. LBAs that are grouped with the destaged LBAs may be released from their grouping, as shown at 1601.

Then, the storage cache program updates the entry of the batching command history table if all of batching command entries are destaged, and the related cache entry of the cache table is removed.

Figure 17:
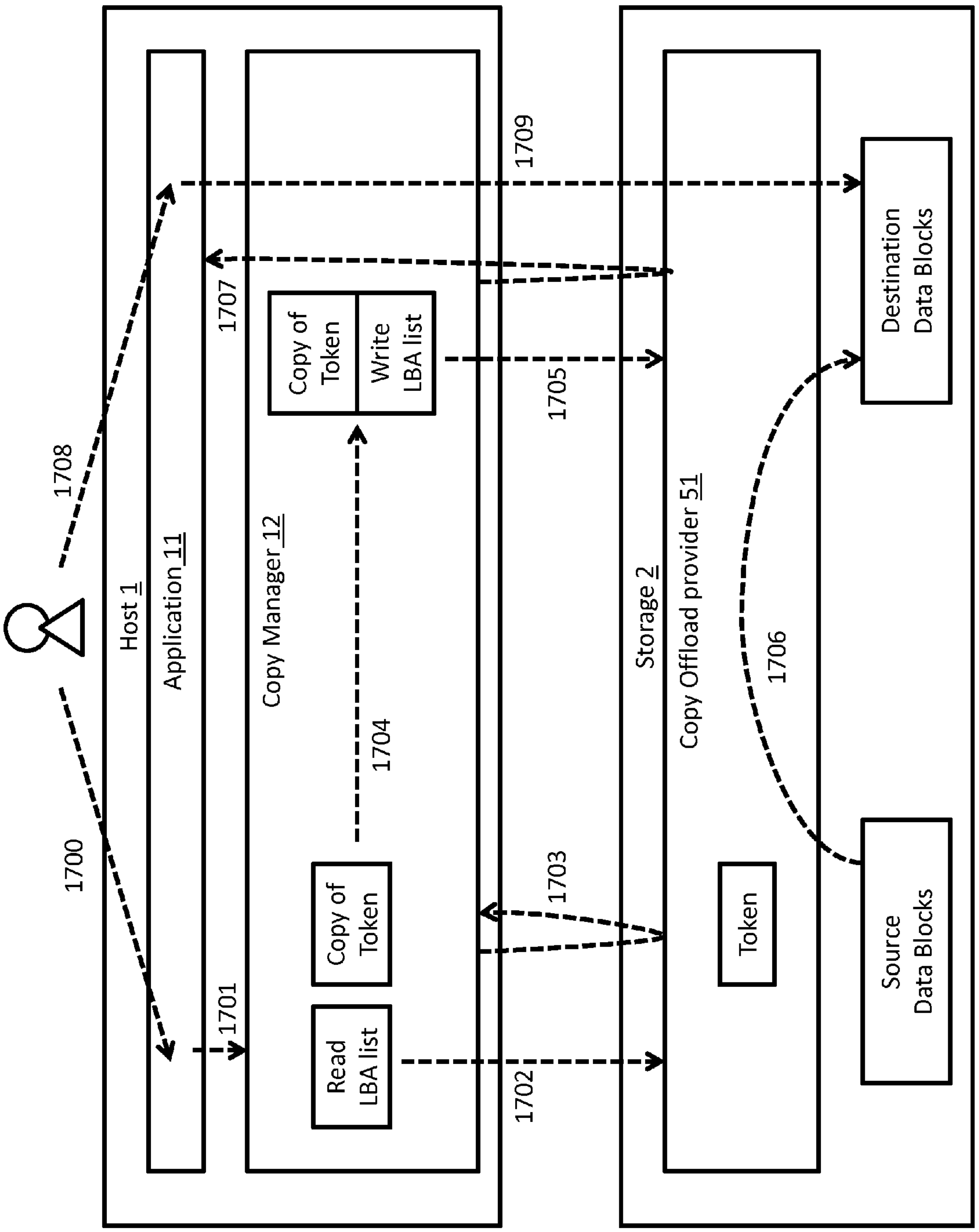
FIG. 17 illustrates a flow diagram for a copy offload operation, in accordance with an example implementation.

FIG. 17 illustrates a flow diagram for a copy offload operation, in accordance with an example implementation. The host copies a file, wherein the file system of the host operating system (OS) application searches for unallocated (empty) storage blocks and scatters one file to one or multiple of empty blocks. When the host copies a file, the host sends multiple read commands, then the host retrieves the corresponding data set and sends multiple write commands. The copy offload involves batching multiple read or write commands and offloading copy data to the storage system.

At 1700, the user indicates to copy a data set (e.g. a file). At 1701, the gost application (e.g. host filesystem) instructs the copy manager to read the corresponding data set and write the data set. At 1702, the copy manager gathers the read operation as a proxy read (e.g. read token) command and reads the LBA list. At 1703, the storage copy offload provider program generates the token of the proxy read (read token) command, wherein the copy manager receives the token generated in the storage. At 1704, the copy manager send the token to write process of the copy destination. At 1705, the copy manager sends the write token command, along with the token and the LBA list of the copy destination to the batching write process. At 1706, the storage copy offload provider performs a copy to data operation from the copy source of the proxy read LBA list, to the copy destination of the proxy write LBA list. The data transfer occurs in the storage system (or between storage systems), so that the host does not read or write actual data. At 1707, when the storage copy offload provider completes the copy offload process, the host copy manager receives the proxy write result and returns the result of the copy process to the host application, thereby ending the copy offload operation. At 1708, the user can then read or write on the copy destination data to modify the data and make new revisions as desired. At 1709, an application (e.g. file system) issues read or write commands to storage 2.

Second Example Implementation

Figure 18:
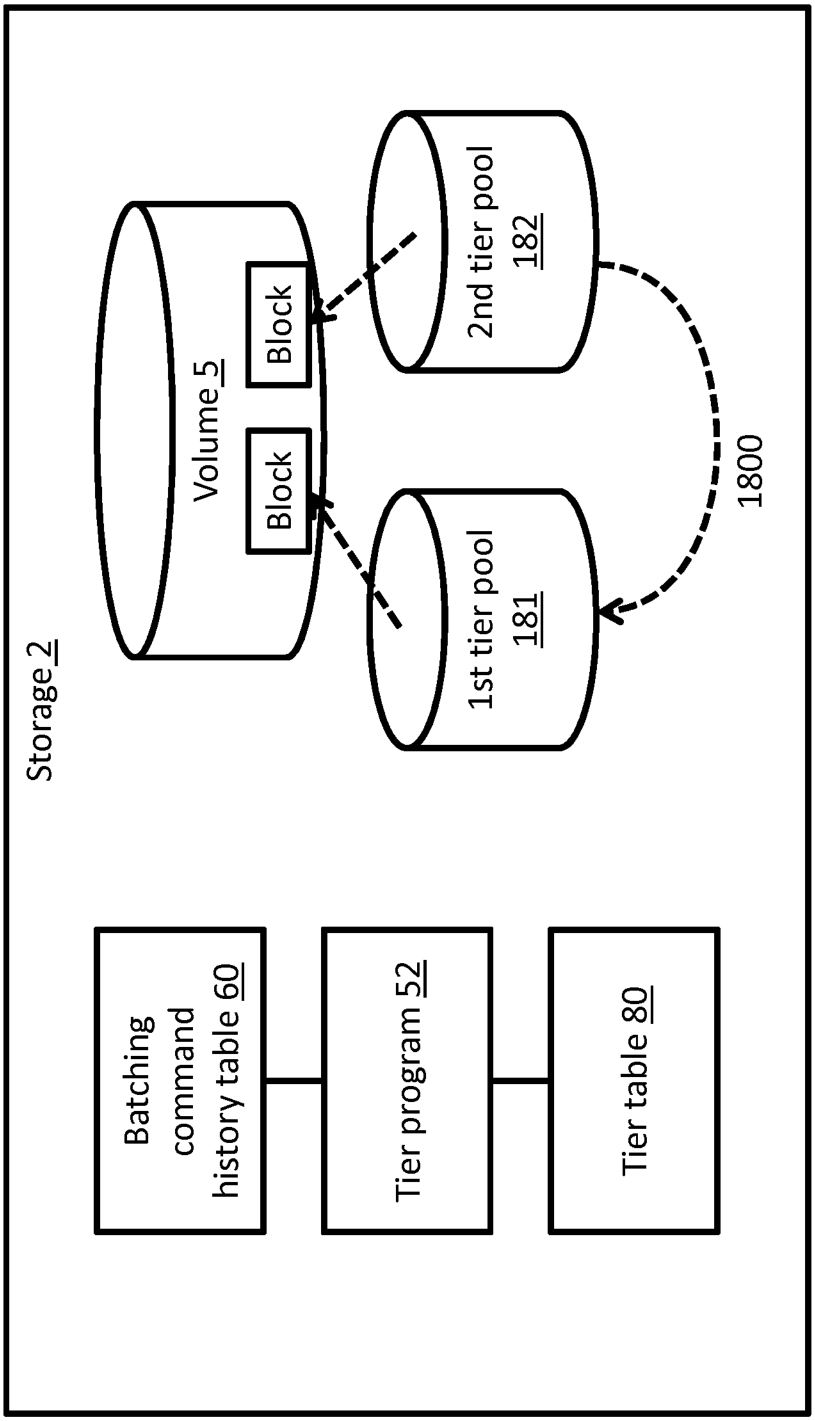
FIG. 18 illustrates an implementation of tier storage, in accordance with an example implementation.

FIG. 18 illustrates an implementation of tier storage, in accordance with an example implementation. In the example implementation as shown in FIG. 18, the storage 2 has two or more tier pools, as shown at 181 and 182. The tier program 52 and the tier table 80 manages the mapping of the location between blocks of volume and multiple tier pool blocks (tier page). In the example of FIG. 18, a storage block of the second tier pool 182 is moved to the first tier pool 181.

Figure 19:
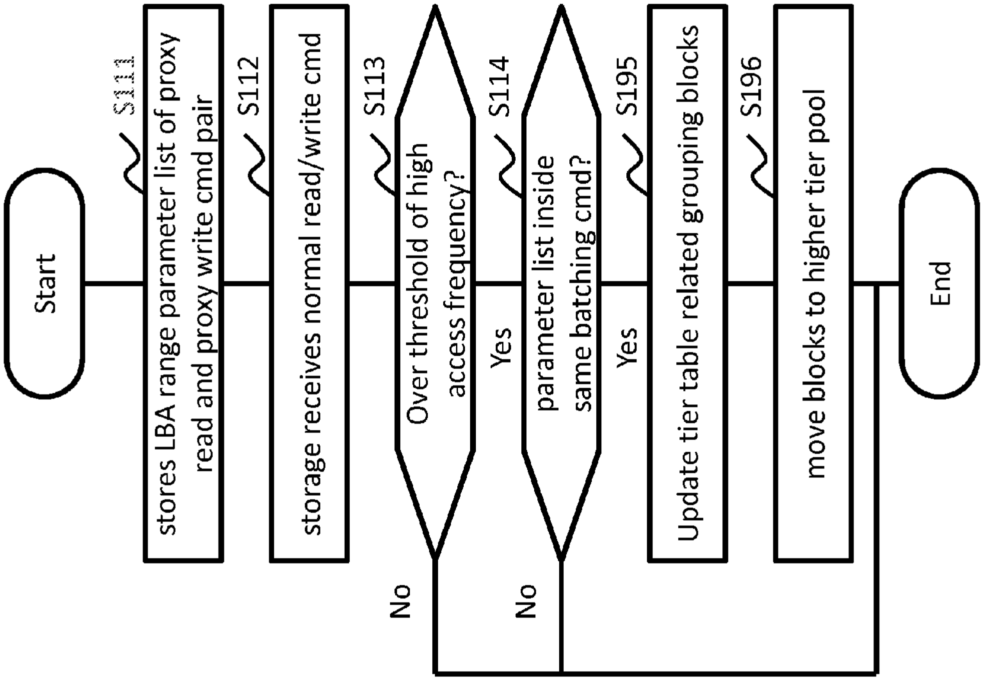
FIG. 19 illustrates a flow cart of tier management with batching command grouping, in accordance with an example implementation.

FIG. 19 illustrates a flow cart of tier management with batching command grouping, in accordance with an example implementation. The flow is similar to FIG. 11 with respect to S111-S114. The differences are indicated at S195 and S196. At S195 the related grouped blocks are updated in the tier table. At S196, blocks are moved to a higher tier pool.

Figure 20:
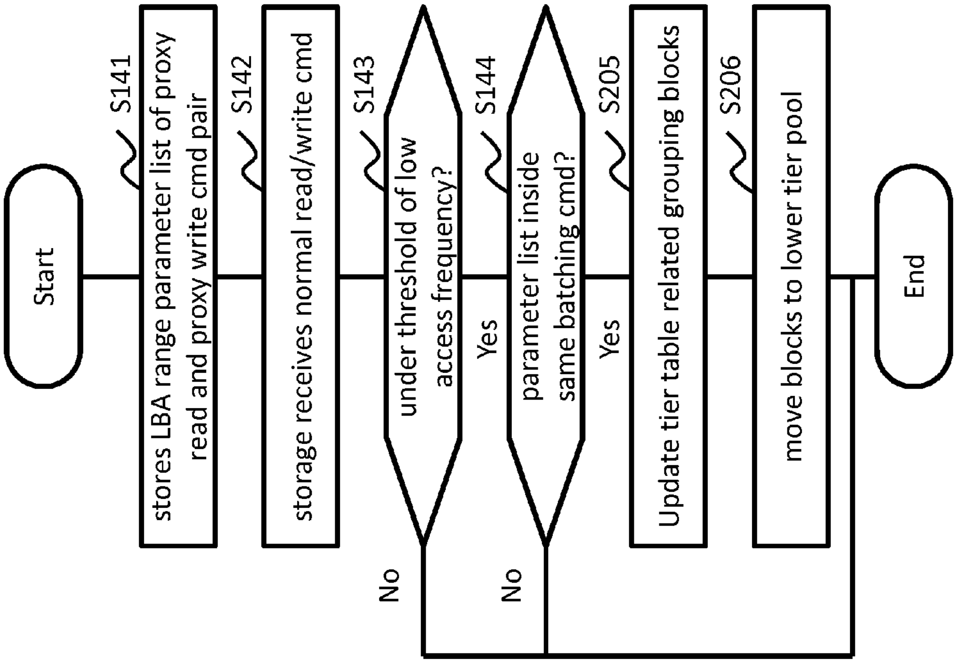
FIG. 20 illustrates the flow cart of tier management with batching command grouping, in accordance with an example implementation.

FIG. 20 illustrates the flow cart of tier management with batching command grouping, in accordance with an example implementation. The flow chart is similar to FIG. 14 with respect to S141-S144. The differences are indicated at S205 and S206. At S205 the related grouped blocks are updated in the tier table. At S206, blocks are moved to a lower tier pool.

Figure 21A:
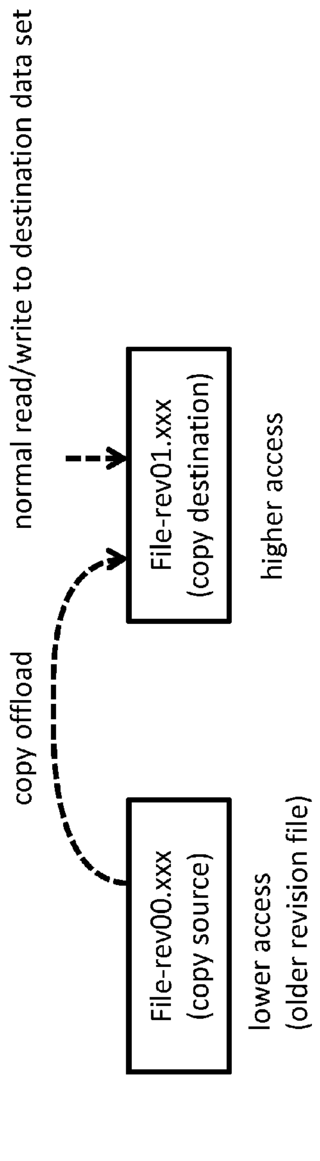
FIG. 21(*a*) and FIG. 21(*b*) illustrates use cases of the copy offload batching command and tier management, in accordance with an example implementation.
Figure 21B:
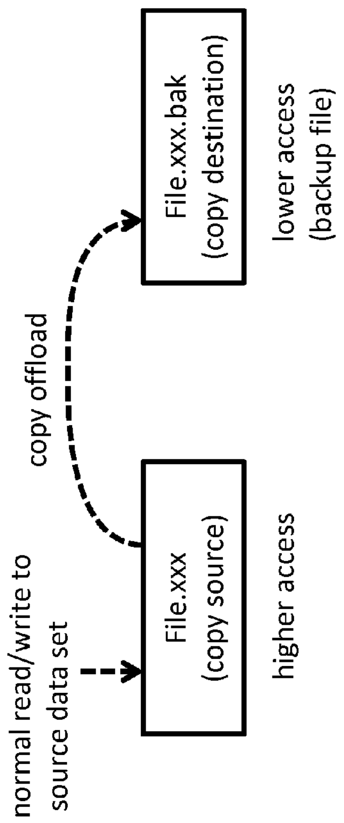

FIG. 21(*a*) and FIG. 21(*b*) illustrate use cases of the copy offload batching command and tier management, in accordance with an example implementation. In the example use case of FIG. 21(*a*), the user copies a new file and an update destination file to revise a destination file. When the file copy operation is completed, the old file of the copy source is designated as having low access frequency and the new file of the copy destination is designated as a high read or write access frequency. In the example use case of FIG. 21(*b*), the user copies a new file to a backup current file and the user modifies the source file. When the file copy is completed, the original file of the copy source is designated as having a high read or write access frequency and the backup file of copy destination is designated as having a low access frequency.

In example implementations, the copy read and write commands and modification read or write commands are in the same read or write SCSI command, so these command types are not substantially different. However, by using copy offload command, the copy operation SCSI command set and the modification read or write SCSI commands have different operation codes, so these command types have some distinctions.

FIG. 22 illustrates an interaction between the tier table and the batching command history table for grouping the tier entry, in accordance with an example implementation. When the storage receives a copy offload command pair of proxy read and proxy write, storage program stores the pair in the batching command history table with token number 2200 (number #A). The storage program measures the access frequency of the read or write command, including the range of the batching command LBA list, and updates the batching command history table entry 63. The storage program compares the batching command history table entries 63 between proxy read and proxy write command set of same token set 2200. When specific entry 2202 is changed access frequency from higher to lower and the lower threshold for the low access frequency is exceeded and another command is higher access frequency 2202, the storage tier program updates the specific tier table entry 83 as having the same group identifier 2203. Then the storage tier program moves the specific entry block from the higher tier pool to the lower tier pool. Also, when access frequency of another command is higher threshold is exceed to batching command history table entry 63, then storage tier program updates the tier table 80 entry 83 as having same group identifier 2203 and storage tier program moves the specific entry 2203 block move to higher tier pool.

Figure 23:
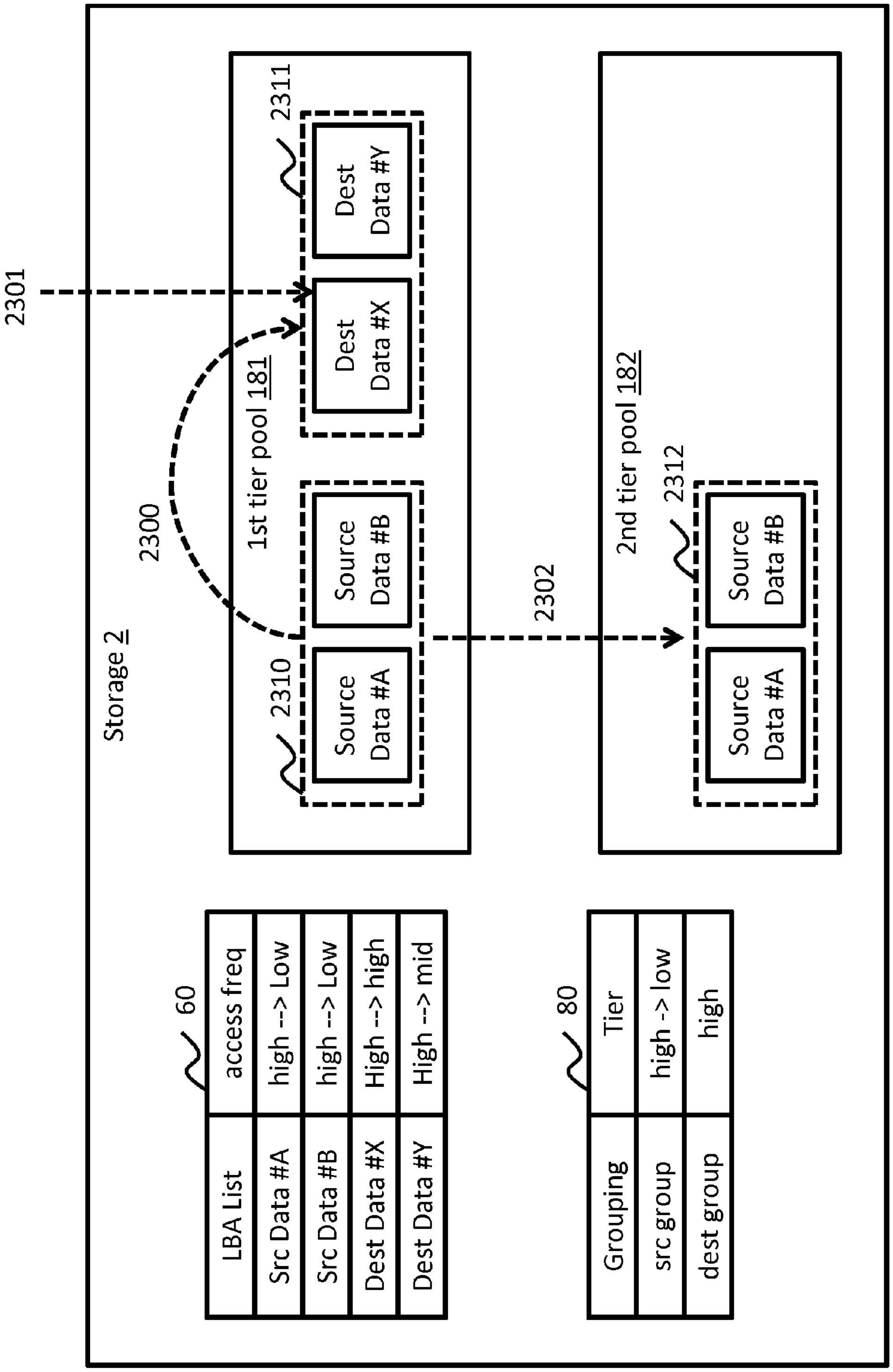
FIGS. 23-26 illustrate example tier management flow diagrams, in accordance with example implementations.

FIG. 23 illustrates a tier management flow diagram, in accordance with an example implementation. In the example of FIG. 23, the copy source is the first tier pool, and the host issues a read or write access to the copy destination blocks. At 2300, when the storage receives a copy offload (proxy read and write) command pair from the host, then the storage offloads a copy operation from the source data blocks 2310 to the destination data blocks 2311 without traffic between the host and the storage. At 2301, the storage receives a read or write command from the host to modify a new file (the copy destination 2311), then the storage program adds an entry for the copy offload command pair in the batching command history table 60, then the storage program updates the access frequency of the batching command history table 60 to change access frequency of source data entries with lower access and to update access frequency of destination data entries with higher or medium access frequency, and updates tier table 80 to group same lower access frequency (not shown), and updates the tier table 80 to change the source group tier from higher tier to lower tier. At 2302, the storage tier program moves the specific data blocks of the copy source 2310 of the copy offload operation (in this example, moving to the lower tier 182 to the specific data blocks 2312).

Figure 24:
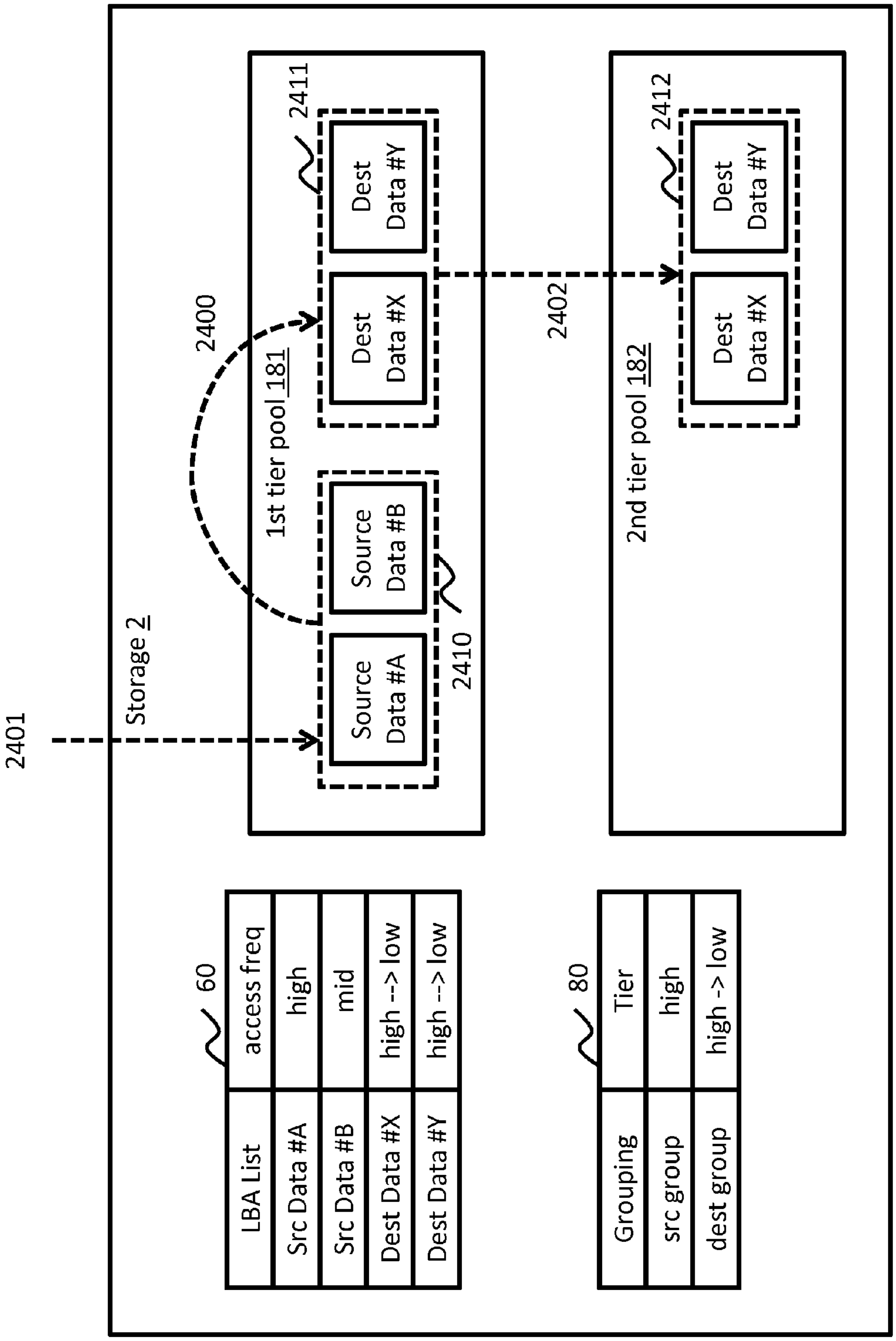

FIG. 24 illustrates a tier management flow diagram, in accordance with an example implementation. In the example of FIG. 24, the copy source 2410 is the first tier pool, and the host issues a read or write access to the copy source blocks 2410. At 2400, the host issues a copy offload (proxy read and write) command pair, wherein the storage offloads a copy operation without traffic between the host and the storage. At 2401, the host issues a read or write command to modify the source data set 2410, wherein the storage program adds the entry of copy offload command pair to batching command history table 60. The storage program updates the access frequency and updates the tier table 80 to change the tier of the destination group from higher tier to lower tier. At 2402, the storage tier program moves the destination data set 2411 over to specific data blocks 2402 of the lower tier storage 182.

Figure 25:
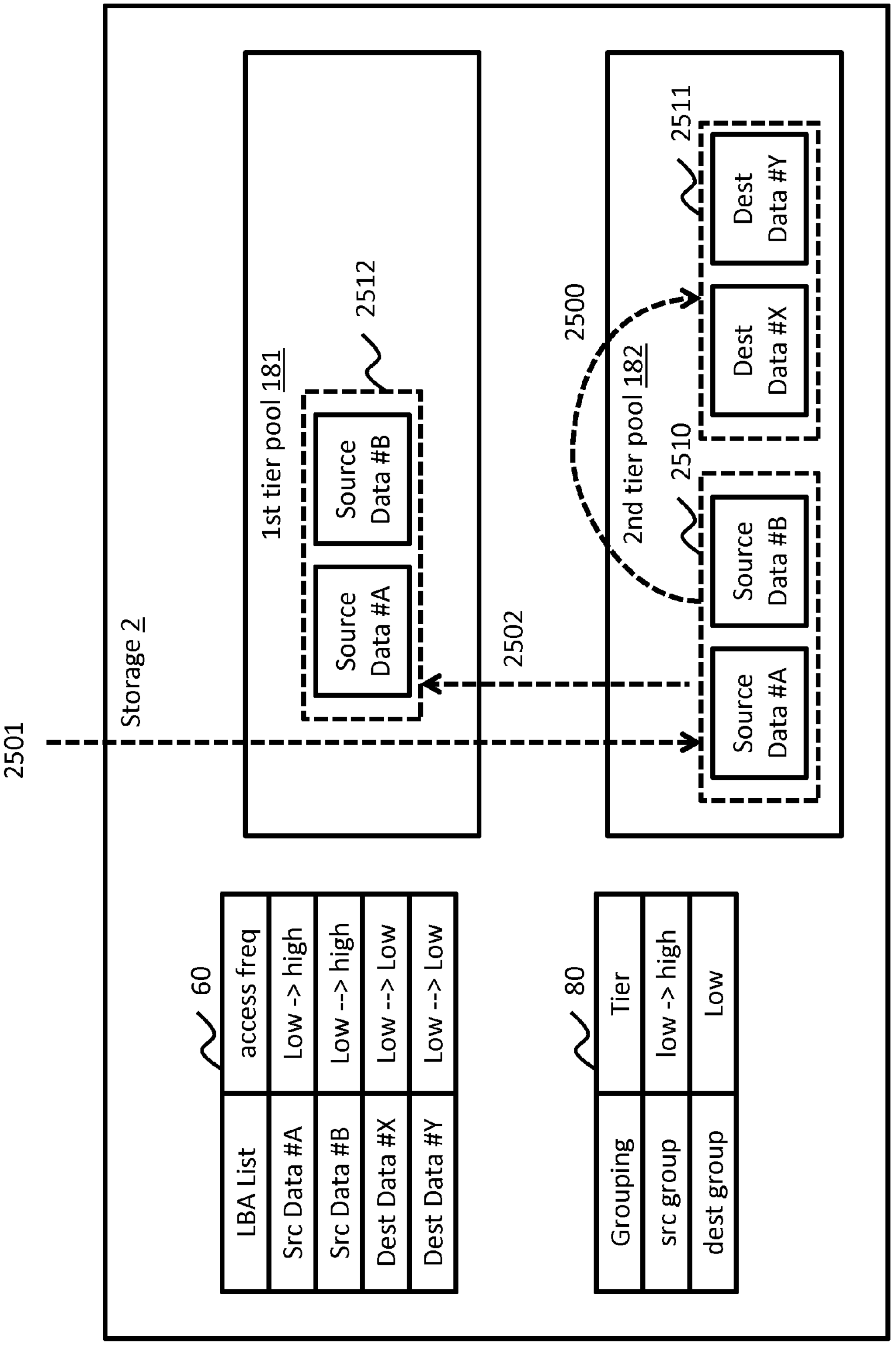

FIG. 25 illustrates a tier management flow diagram, in accordance with an example implementation. In the example of FIG. 25, the copy source 2510 is the second tier pool, and the host issues a read or write access to the copy source blocks 2510. At 2500, when the storage receives a copy offload (proxy read and write) command pair from the host, then the storage offloads a copy operation from source data blocks 2510 to destination data blocks 2511 without traffic between the host and the storage. At 2501, the host issues a read or write command to modify the source data set 2510, wherein the storage program adds the entry of copy offload command pair to batching command history table 60. The storage program updates the access frequency, and updates the tier table 80 to change the source group entry to higher tier from lower tier. At 2502, the storage tier program moves the source data set 2510 over to the higher tier storage.

Figure 26:
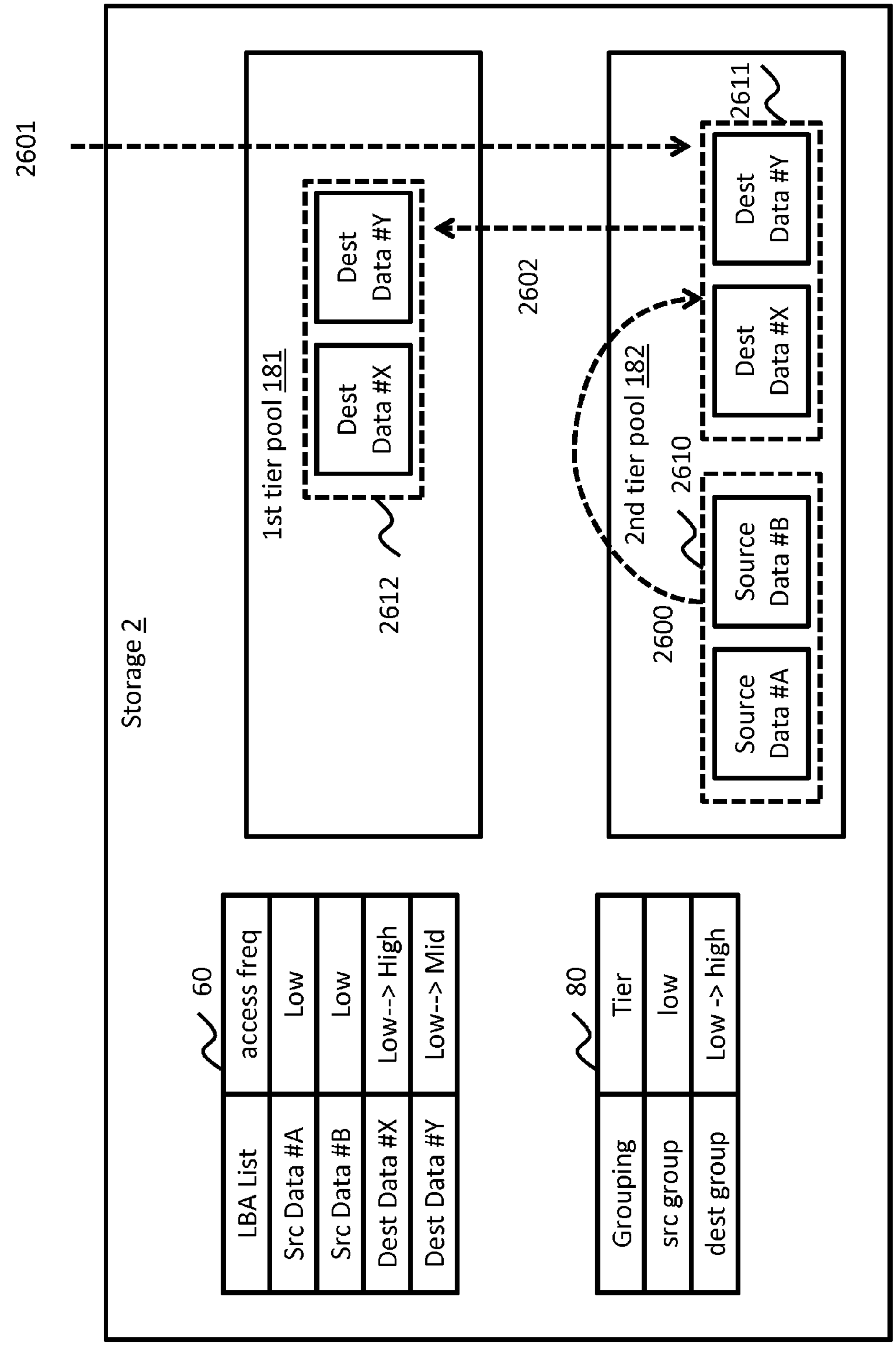

FIG. 26 illustrates a tier management flow diagram, in accordance with an example implementation. In the example of FIG. 26, the copy source 2610 is the second tier pool, and the host issues a read or write access to the copy destination blocks 2611. At 2600, when the storage receives a copy offload (proxy read and write) command pair from the host, then the storage conducts the offload copy operation from source data set 2610 to destination data set 2611 without traffic between the host and the storage. At 2601, the host issues a read or write command to modify the destination data set, wherein the storage program adds the copy offload command pair entry to the batching command history table 60. The storage program updates the access frequency and updates the tier table 80 to change the tier of the destination group from low tier to high tier. At 2602, the storage tier program moves the destination data set 2611 over to specific blocks 2612 of the higher tier storage.

Third Example Implementation

Figure 27:
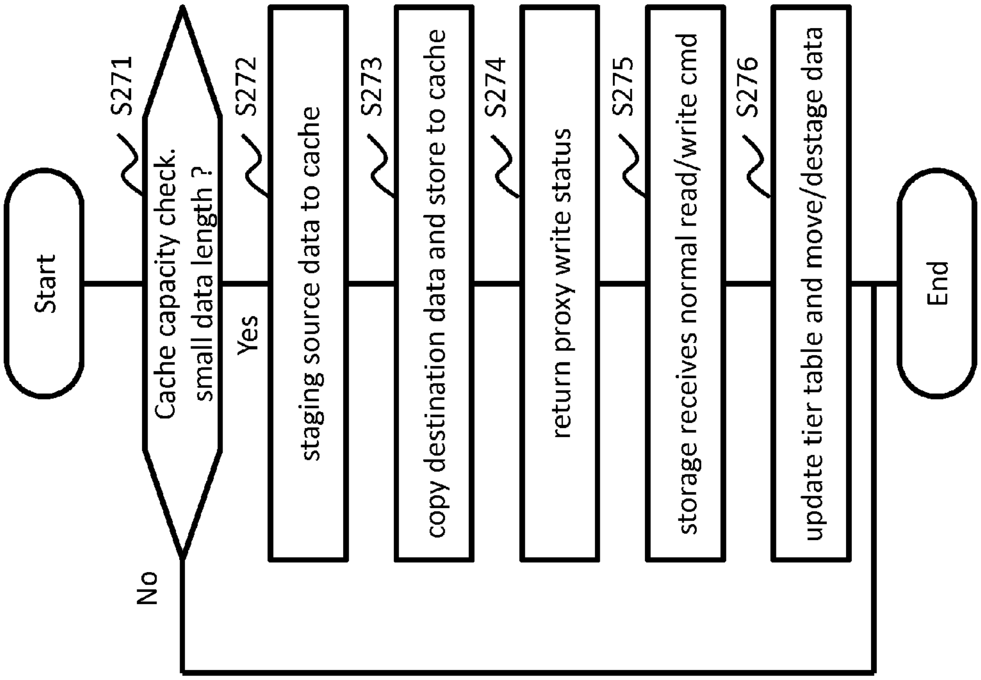
FIG. 27 illustrates a flow chart to manage tier movement, in accordance with an example implementation.

FIG. 27 illustrates a flow chart to manage tier movement, in accordance with an example implementation. The example implementation as depicted in FIG. 27 utilizes the cache memory as the copy source buffer and as the copy destination buffer, to reduce the media (HDD or SSD of FIG. 4) access frequency of the copy offload operation and the tier movement operation. At S271, when the storage receives proxy read command, then storage program checks the batching command length to determine if the copy operation total length (twice of batching command length of the proxy read command) is of a sufficiently small length in comparison to the free cache capacity to stage both the copy source and the copy destination blocks. At S272, if the length is sufficiently small in comparison to the free cache capacity, the storage copy offload provider program stages the copy source data blocks indicated by the proxy read command LBA list to cache memory. At S273, the storage copy offload provider program copies the destination data blocks indicated by the proxy write command LBA list from source data blocks indicated by the proxy read command LBA list in the cache memory. At S274, the storage copy offload provider program and the copy offload provider program return the proxy write completion status when the host issues result check command 1707 of FIG. 17. Thus, the storage copy offload provider program keeps the destination data blocks in the cache memory and does not destages the destination write data to the current tier pool. At S275, the storage receives a read or write command from the host and determines which LBA of the command is within the proxy read LBA list or the proxy write LBA list. The storage tier program then updates the access frequency accordingly. At S276, the storage tier program updates the tier table of the copy source or the copy destination, and then updates the tier field and destages the data blocks to the new tier pool.

Figure 28:
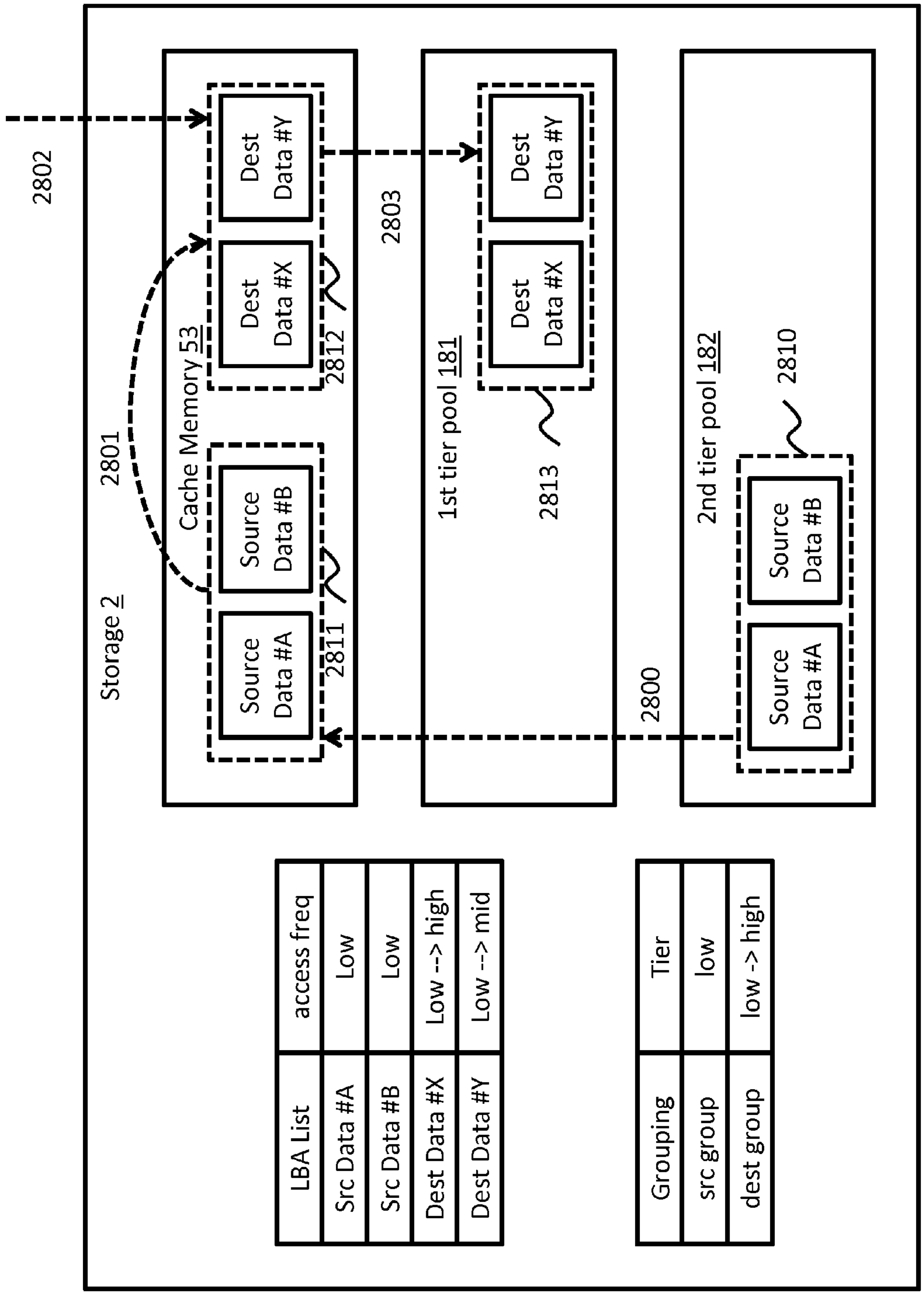
FIGS. 28-31 illustrate example tier management flow diagrams, in accordance with example implementations.

FIG. 28 illustrates a tier management flow diagram, in accordance with an example implementation. In the example shown in FIG. 28, the copy source is in the second tier pool, and the host issues a read or write access to the copy destination blocks. The copy offload total buffer length of the proxy read or proxy write command pair is small enough to be conducted in cache memory.

At 2800, when the storage receives a copy offload (proxy read and write) command pair from the host, then the storage stages source copy data 2810 from the tier pool to the copy source buffer area 2811 in the cache memory to prepare to operate copy offload. The source data blocks are indicated by the LBA range parameter list of the proxy read command. At 2801, the storage conducts the offload copy operation from the copy source buffer area 2811 to the copy destination buffer area 2812 without traffic between the host and the storage. The storage copy offload provider program copies from the source data blocks to the destination data blocks indicated by the LBA range parameter list of the proxy write command. The storage copy offload provider program returns a proxy write result status to the host. The copy offload operation is completed in the cache memory without the destaged destination copy data blocks of the second tier pool. At 2802, the storage receives a read or write command from the host to modify the copy destination data blocks, whereupon the storage program adds an entry for the copy offload command pair to the batching command history table, and then storage program updates the access frequency and updates the tier table to change the destination group tier from lower tier to higher tier. At 2803, the storage tier program move specific data blocks without read or write to the second pool. The storage cache program writes dirty data of the copy destination data blocks 2812 that copy offload destination dirty data and normal write dirty data to specific data blocks 2813 of the first tier pool. This operation is conducted by writing copy destination data blocks to the second tier of copy offload operation, and by reading the destination data blocks in the second tier pool to move them from the second tier pool to the first tier pool.

Figure 29:
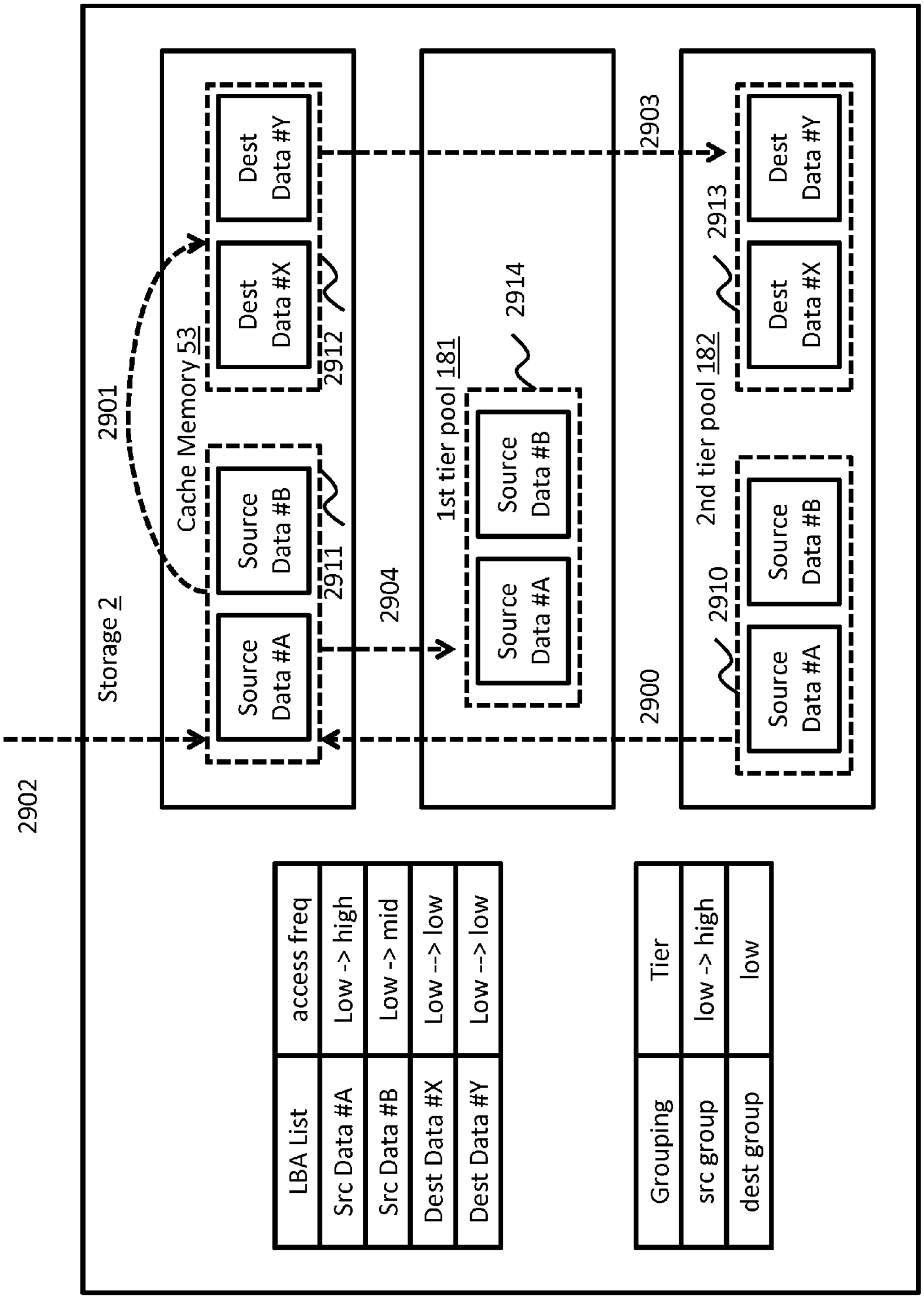

FIG. 29 illustrates a tier management flow diagram, in accordance with an example implementation. In the example depicted in FIG. 29, the copy source is in the second tier pool, and the host issues a normal read or write access to copy source blocks.

At 2900, when the storage receives a copy offload (proxy read and write) command pair from the host, then the storage stages source copy data 2910 from the tier pool to the copy source buffer area 2911 in the cache memory to prepare to operate copy offload. The source data blocks are indicated by the LBA range parameter list of the proxy read command. At 2901, the storage conducts the offload copy operation from the copy source buffer area 2911 to the copy destination buffer area 2912 without traffic between the host and the storage. The storage copy offload provider program copies from the source data blocks to the destination data blocks indicated by the LBA range parameter list of the proxy write command. The storage copy offload provider program returns a proxy write result status to the host. The copy offload operation is completed in the cache memory without the destaged destination copy data blocks of the second tier pool. At 2902, the storage receives a read or write command from the host to modify the source data blocks, whereupon the storage program adds an entry for the copy offload command pair to the batching command history table, and then the storage program updates the access frequency and updates the tier table to change the source group tier from lower tier to higher tier. At 2903, the storage tier program move specific data blocks without read or write to the second tier pool. The storage cache program writes dirty data of the copy destination data blocks 2912 that copy offload destination dirty data and normal write dirty data to specific data blocks 2913 of the second tier pool. At 2904, the source data blocks are destaged to data blocks 2914 of the first tier pool, which moves the source data blocks to a higher tier. As a result, the source data blocks of the second tier pool can be unmapped.

Figure 30:
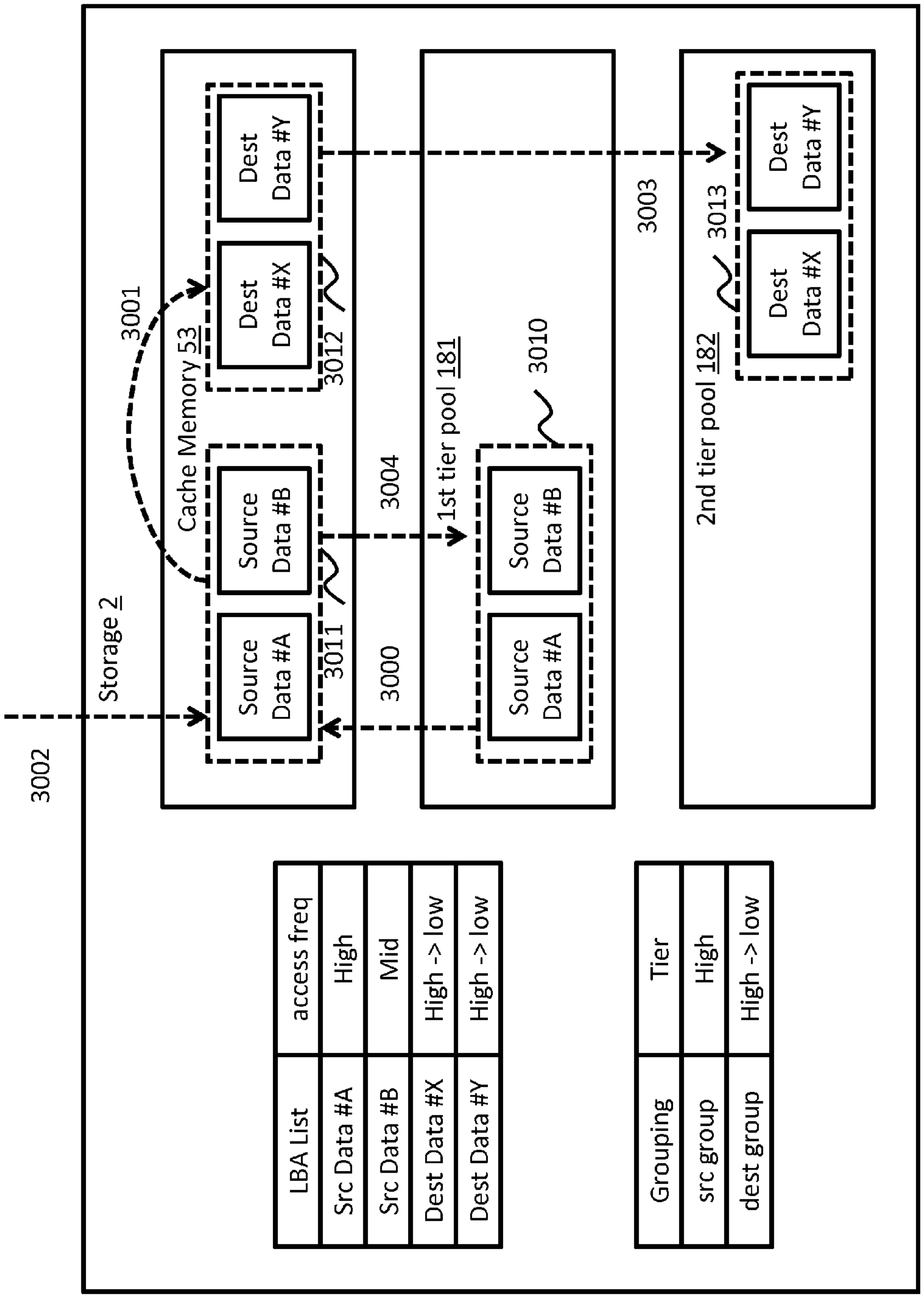

FIG. 30 illustrates a tier management flow diagram, in accordance with an example implementation. In the example depicted in FIG. 30, the copy source is in the first tier pool, and the host issues a read or write access to the copy source blocks.

At 3000, when the storage receives a copy offload (proxy read and write) command pair from the host, then the storage stages source copy data 3010 from the first tier pool to the copy source buffer area 3011 in the cache memory to prepare to operate copy offload. The source data blocks are indicated by the LBA range parameter list of the proxy read command. At 3001, the storage copy offload provider program copies from the copy source buffer area 3011 to the copy destination buffer area 3012 without traffic between the host and the storage. The storage copy offload provider program copies from the source data blocks to the destination data blocks indicated by the LBA range parameter list of the proxy write command. The storage copy offload provider program returns a proxy write result status to the host. The copy offload operation is completed in the cache memory. At 3002, the storage receives a read or write command to modify the source data blocks from the host, whereupon the storage program adds an entry for the copy offload command pair to the batching command history table, and then the storage program updates the access frequency and updates the tier table to change the destination group tier from lower tier to higher tier. At 3003, the storage tier program move specific data blocks without read or write to the second pool. The storage cache program writes dirty data of the copy destination data blocks 3012 that copy offload destination dirty data and normal write dirty data to specific data blocks 3013 of the second tier pool. At 3004, the source data blocks are destaged back to the blocks 3010 of the first tier pool.

Figure 31:
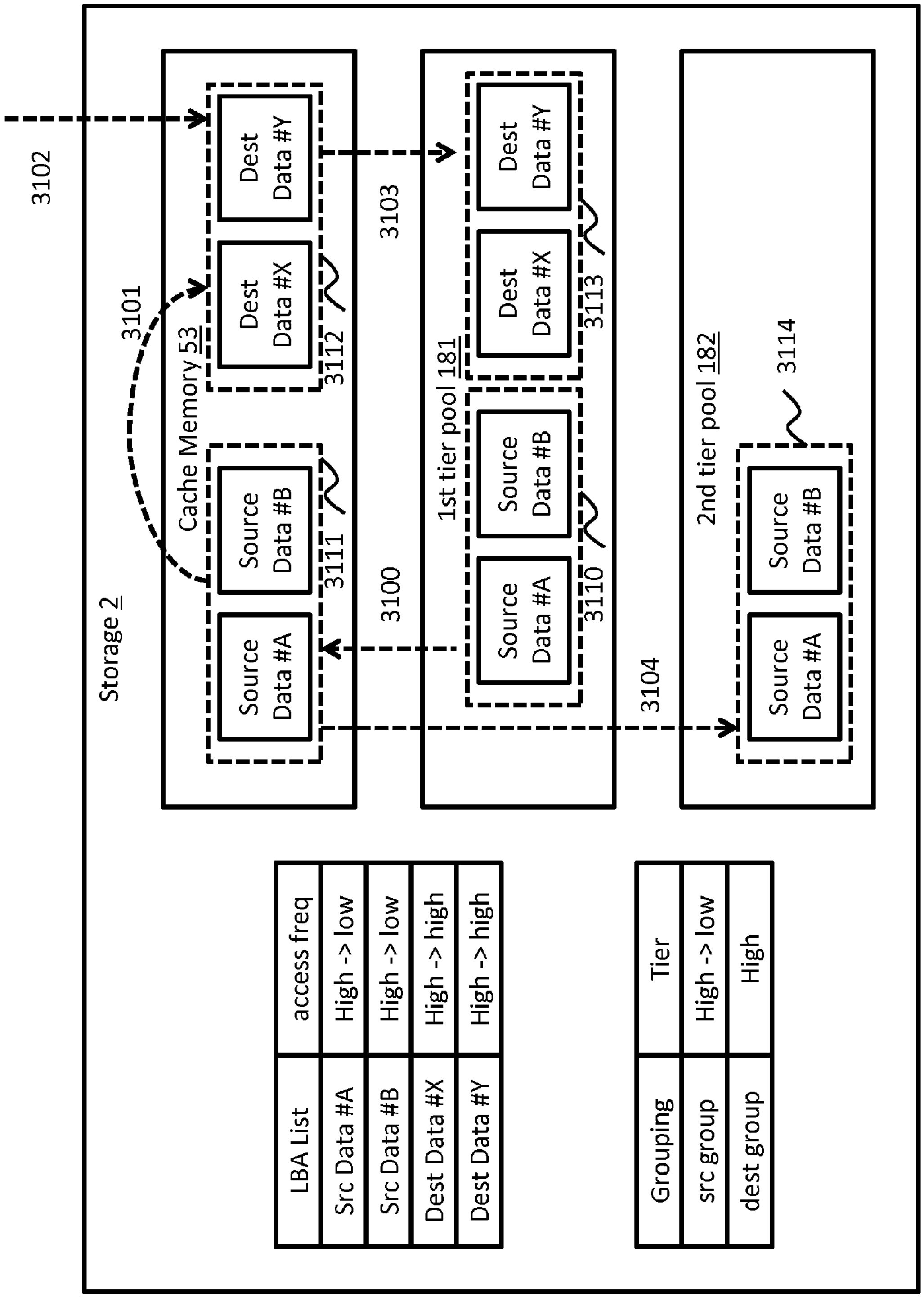

FIG. 31 illustrates a tier management flow diagram, in accordance with an example implementation. In the example depicted in FIG. 31, the copy source is in the first tier pool, and the host issues a read or write access to the copy destination blocks.

At 3100, when the storage receives a copy offload (proxy read and write) command pair from the host, then the storage stages source copy data 3110 from the first tier pool to the copy source buffer area 3111 in the cache memory to prepare to operate copy offload. The source data blocks are indicated by the LBA range parameter list of the proxy read command. At 3101, the storage copy offload provider program copies from the copy source buffer area 3111 to the copy destination buffer area 3112 without traffic between the host and the storage. The storage copy offload provider program copies from the source data blocks to the destination data blocks indicated by the LBA range parameter list of the proxy write command. The storage copy offload provider program returns a proxy write result status to the host. The copy offload operation is completed in the cache memory. At 3103, the host issues a read or write command to modify the destination data blocks, whereupon the storage program adds an entry for the copy offload command pair to the batching command history table, and then the storage program updates the access frequency and updates the tier table to change the source group tier from higher tier to lower. At 3103, the storage tier program move specific data blocks without read or write to the first tier pool. In this example, the destination copy blocks are destaged to the first tier pool. The storage cache program writes dirty data of the copy destination data blocks 3112 to the specific data blocks 3113 of the first tier pool. At 3104, the source data blocks are destaged to blocks 3114 of the second tier pool, which allows the source data blocks 3110 in the first tier pool to be unmapped.

Fourth Example Implementation

Figure 32:
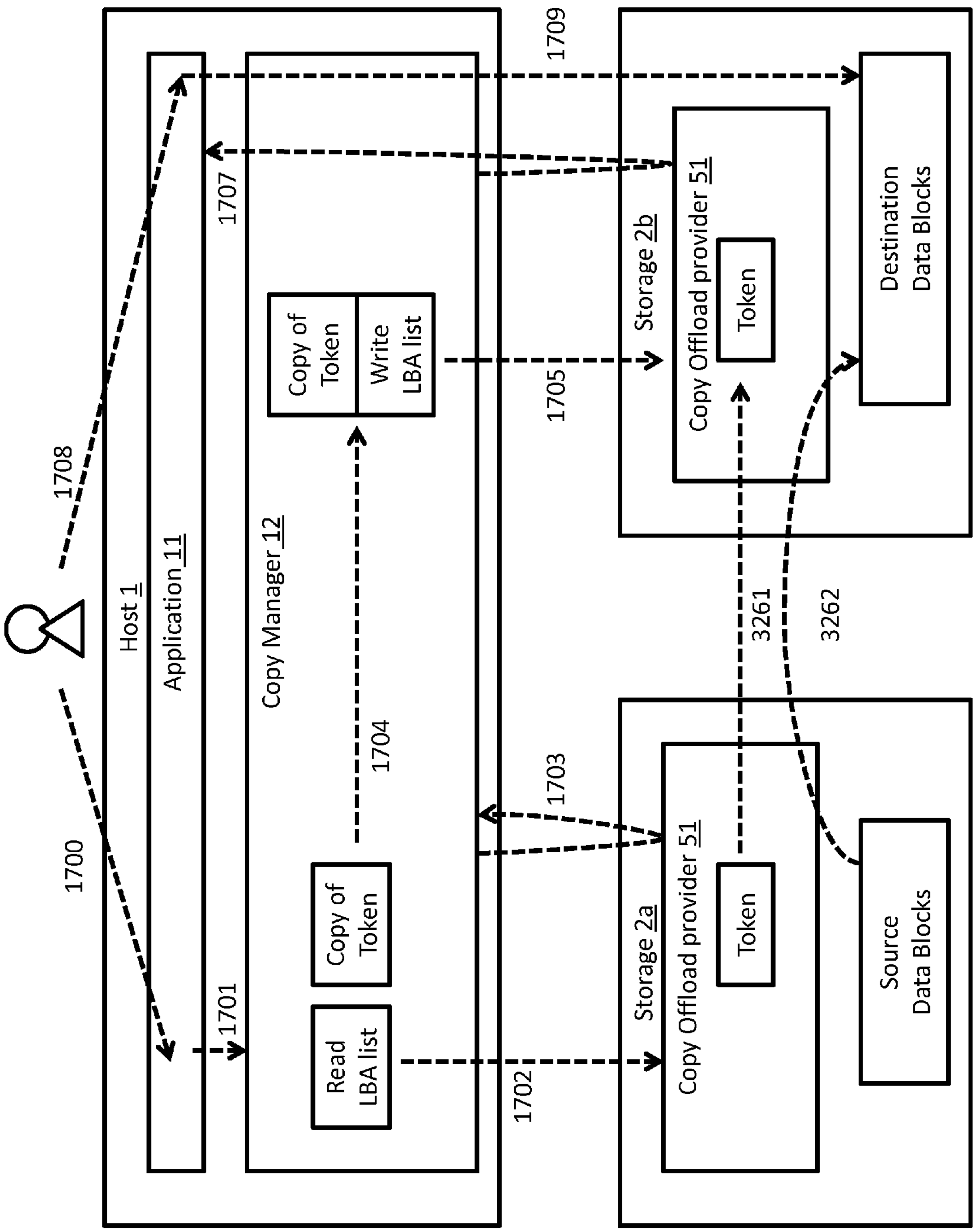
FIG. 32 illustrates a flow diagram for a copy offload operation between two storages, in accordance with an example implementation.

FIG. 32 illustrates a flow diagram for a copy offload operation between two storages, in accordance with an example implementation. FIG. 32 is similar to FIG. 17 without step 1706, when step 1705 is performed. At 3261, when the destination storage 2*b* receives a write token command from host, the copy offload provider of the destination storage 2*b* get token information from the source storage to communicate between copy offload provider of the source storage 2*a*. Also, the copy offload provider of the destination storage 2*b* gets tier information and batching command history table to synchronize between the source storage and destination storage. At 3261, both copy offload providers of the source storage and the destination storage perform copy offload operation without host data traffic. At 1707, onward, the operation proceeds like the operation of FIG. 17. The second and third example implementations are applied to fourth example implementation of a multiple storage environment.

Moreover, other implementations of the examples will be apparent to those skilled in the art from consideration of the specification and practice of the invention disclosed herein. Various aspects and/or components of the described example implementations may be used singly or in any combination. It is intended that the specification and examples be considered as exemplary only, with a true scope and spirit of the example implementations being indicated by the following claims.

What is claimed is:

1. A storage system, comprising:

a memory configured to store command history information that comprises a history of commands;

an interface configured to receive a command from a computer; and a controller configured to:

create, as a group, a relationship between a plurality of areas storing a plurality of data accessed by the command;

manage the plurality of data of the plurality of the areas at a same access level based on the relationship, wherein the group is formed from the plurality of areas based on the command history information; and migrate the plurality of data of the plurality of the areas as a group between tier storage pools based on the same access level.

2. The storage system of claim 1, wherein when the command is a copy offload command for a first data of the plurality of data in a first tier storage pool, the controller is configured to copy the first data to a copy destination in the first tier storage pool as a second data; and wherein when the interface receives a subsequent read/write command for the second data, the controller is configured to change a tier of a group associated with the first data to a lower tier, and move the first data to a second tier storage pool.

3. The storage system of claim 1, wherein when the command is a copy offload command for a first data of the plurality of data in a first tier storage pool, the controller copies the first data to a copy destination in the first tier storage pool as a second data;

wherein when the interface receives a subsequent read/write command for the first data, the controller is configured to change a tier of a group associated with the second data to a lower tier, and move the second data to a second tier storage pool.

4. The storage system of claim 1, wherein when the command is a copy offload command for a first data of the plurality of data in a second tier storage pool, the controller copies the first data to a copy destination in the second tier storage pool as a second data;

wherein when the interface receives a subsequent read/write command for the first data, the controller is configured to change a tier of a group associated with the first data to a higher tier, and move the first data to a first tier storage pool.

5. The storage system of claim 1, wherein when the command is a copy offload command for a first data of the plurality of data in a second tier storage pool, the controller copies the first data to a copy destination in the second tier storage pool as a second data;

wherein when the interface receives a subsequent read/write command for the second data, the controller is configured to change a tier of a group associated with the second data to a higher tier and move the second data to a first tier storage pool.

6. The storage system of claim 1, wherein when the command is a copy offload command for a first data of the plurality of data in a second tier storage pool, the controller is configured to move the first data to cache and copy the first data in the cache to a copy destination in the cache as a second data;

wherein when the interface receives a subsequent read/write command for the second data, the controller is configured to change a tier of a group associated with the second data to a higher tier, and move the second data to a first tier storage pool.

7. The storage system of claim 1, wherein when the command is a copy offload command for a first data of the plurality of data in a second tier storage pool, the controller is configured to move the first data to cache and copy the moved first data to a copy destination in the cache as a second data;

wherein when the interface receives a subsequent read/write command for the first data, the controller is configured to change a tier of a group associated with the first data to a higher tier, move the first data to a first tier storage pool, and move the second data to the second tier storage pool.

8. The storage system of claim 1, wherein when the command is a copy offload command for a first data of the plurality of data in a first tier storage pool, the controller is configured to move the first data to cache and copy the moved first data to a copy destination in the cache as a second data;

wherein when the interface receives a subsequent read/write command for the first data, the controller is configured to change a tier of a group associated with the second data to a lower tier, move the first data to the first tier storage pool, and move the second data to a second tier storage pool.

9. The storage system of claim 1, wherein when the command is a copy offload command for a first data of the plurality of data in a first tier storage pool, the controller is configured to move the first data to cache and copy the moved first data to a copy destination in the cache as a second data;

wherein when the interface receives a subsequent read/write command for the second data, the controller is configured to change a tier of a group associated with the first data to a lower tier, move the first data to a second tier storage pool, and move the second data to the first tier storage pool.

10. A method, comprising:

receiving a command from a computer;

creating, as a group, a relationship between a plurality of areas storing a plurality of data accessed by the command;

managing the plurality of data of the plurality of the areas at a same access level based on the relationship, wherein the group is formed from the plurality of areas based on command history information that comprises a history of commands; and migrating the plurality of data of the plurality of the areas as a group between tier storage pools based on the same access level.

11. The method of claim 10, further comprising:

when the command is a copy offload command for a first data of the plurality of data in a first tier storage pool, copying the first data to a copy destination in the first tier storage pool as a second data; and wherein when the interface receives a subsequent read/write command for the second data, changing a tier of a group associated with the first data to a lower tier, and moving the first data to a second tier storage pool.

12. The method of claim 10, further comprising:

wherein when the command is a copy offload command for a first data of the plurality of data in a first tier storage pool, copying the first data to a copy destination in the first tier storage pool as a second data; and wherein when the interface receives a subsequent read/write command for the first data, changing a tier of a group associated with the second data to a lower tier, and moving the second data to a second tier storage pool.

13. The method of claim 10, further comprising:

wherein when the command is a copy offload command for a first data of the plurality of data in a second tier storage pool, copying the first data to a copy destination in the second tier storage pool as a second data;

wherein when the interface receives a subsequent read/write command for the first data, changing a tier of a group associated with the first data to a higher tier, and moving the first data to a first tier storage pool.

14. The method of claim 10, further comprising:

wherein when the command is a copy offload command for a first data of the plurality of data in a second tier storage pool, copying the first data to a copy destination in the second tier storage pool as a second data;

wherein when the interface receives a subsequent read/write command for the second data, changing a tier of a group associated with the second data to a higher tier and moving the second data to a first tier storage pool.

15. The method of claim 10, further comprising:

wherein when the command is a copy offload command for a first data of the plurality of data in a second tier storage pool, moving the first data to cache and copying the first data in the cache to a copy destination in the cache as a second data;

wherein when the interface receives a subsequent read/write command for the second data, changing a tier of a group associated with the second data to a higher tier, and moving the second data to a first tier storage pool.

16. The method of claim 10, further comprising:

wherein when the command is a copy offload command for a first data of the plurality of data in a second tier storage pool, moving the first data to cache and copying the moved first data to a copy destination in the cache as a second data;

wherein when the interface receives a subsequent read/write command for the first data, changing a tier of a group associated with the first data to a higher tier, moving the first data to a first tier storage pool, and moving the second data to the second tier storage pool.

17. The method of claim 10, further comprising:

wherein when the command is a copy offload command for a first data of the plurality of data in a first tier storage pool, moving the first data to cache and copying the moved first data to a copy destination in the cache as a second data;

wherein when the interface receives a subsequent read/write command for the first data, changing a tier of a group associated with the second data to a lower tier, moving the first data to the first tier storage pool, and moving the second data to a second tier storage pool.

18. The method of claim 10, further comprising:

wherein when the command is a copy offload command for a first data of the plurality of data in a first tier storage pool, moving the first data to cache and copying the moved first data to a copy destination in the cache as a second data;

wherein when the interface receives a subsequent read/write command for the second data, changing a tier of a group associated with the first data to a lower tier, moving the first data to a second tier storage pool, and moving the second data to the first tier storage pool.

19. The method of claim 10, further comprising creating the group based on a received command token.

20. A non-transitory computer readable storage medium storing instructions for executing a process, the instructions comprising:

receiving a command from a computer;

creating, as a group, a relationship between a plurality of areas storing a plurality of data accessed by the command;

managing the plurality of data of the plurality of the areas at a same access level based on the relationship, wherein the group is formed from the plurality of areas based on command history information that comprises a history of commands; and migrating the plurality of data of the plurality of the areas as a group between tier storage pools based on the same access level.

* * * * *